US011632195B2

(12) United States Patent
Salem

(10) Patent No.: US 11,632,195 B2
(45) Date of Patent: Apr. 18, 2023

(54) METHOD FOR TRANSMISSION OF HARQ FEEDBACK IN GROUP COMMON DOWNLINK CONTROL INFORMATION

(71) Applicant: Mohamed Adel Salem, Kanata (CA)

(72) Inventor: Mohamed Adel Salem, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 85 days.

(21) Appl. No.: 16/830,546

(22) Filed: Mar. 26, 2020

(65) Prior Publication Data
US 2020/0313807 A1 Oct. 1, 2020

Related U.S. Application Data

(60) Provisional application No. 62/826,871, filed on Mar. 29, 2019.

(51) Int. Cl.
H04L 1/18 (2006.01)
H04L 1/1812 (2023.01)
H04W 72/04 (2023.01)
H04W 72/14 (2009.01)
H04L 5/00 (2006.01)

(52) U.S. Cl.
CPC .......... *H04L 1/1812* (2013.01); *H04L 5/0055* (2013.01); *H04W 72/042* (2013.01); *H04W 72/14* (2013.01)

(58) Field of Classification Search
USPC ....... 370/216, 242, 252, 312, 389, 390, 432, 370/473
See application file for complete search history.

(56) References Cited

U.S. PATENT DOCUMENTS

| | | | | |
|---|---|---|---|---|
| 10,785,006 B2* | 9/2020 | Jo | .......................... | H04L 5/0094 |
| 2011/0310814 A1* | 12/2011 | Callard | .................. | H04B 7/155 370/329 |
| 2012/0243462 A1* | 9/2012 | Bucknell | ................ | H04B 7/155 370/315 |
| 2013/0039272 A1* | 2/2013 | Chen | ..................... | H04W 76/25 370/328 |
| 2017/0208568 A1* | 7/2017 | Nam | .................... | H04W 72/121 |

(Continued)

FOREIGN PATENT DOCUMENTS

| | | | |
|---|---|---|---|
| CN | 109041249 A | | 12/2018 |
| CN | 109314627 A | | 2/2019 |

OTHER PUBLICATIONS

3GPP TS 38.212; 3rd Generation Partnership Project; Technical Specification Group Radio Access Network; NR; "Multiplexing and Channel Coding"; Version 15.5.0; Mar. 2019; 101 pages.

(Continued)

*Primary Examiner* — Nguyen H Ngo

(57) ABSTRACT

Aspects of the present disclosure may involve introducing a new downlink feedback information codebook design, a new downlink control information (DCI) format, associated radio resource control (RRC) configuration parameters and UE procedures that can be used in New Radio Unlicensed (NR-U). In some embodiments, the DFI codebook may be of use for providing HARQ feedback with configured grant transmissions. Some embodiments of the disclosure may aid in reducing signaling overhead by grouping HARQ-ACK feedback from a dynamically selected number of UEs.

30 Claims, 8 Drawing Sheets

(56) References Cited

U.S. PATENT DOCUMENTS

| | | | | |
|---|---|---|---|---|
| 2017/0359849 | A1* | 12/2017 | Zhang | H04W 72/1257 |
| 2018/0014298 | A1* | 1/2018 | Sun | H04L 1/1822 |
| 2018/0310280 | A1* | 10/2018 | Byun | H04L 5/0053 |
| 2018/0317213 | A1 | 11/2018 | Islam et al. | |
| 2019/0037601 | A1* | 1/2019 | Noh | H04W 72/0413 |
| 2019/0075563 | A1 | 3/2019 | Babaei et al. | |
| 2019/0097762 | A1* | 3/2019 | Jeon | H04L 1/1864 |
| 2019/0159256 | A1* | 5/2019 | Talarico | H04L 1/187 |
| 2019/0246391 | A1* | 8/2019 | Zhang | H04L 27/0006 |
| 2019/0306700 | A1* | 10/2019 | Lin | H04W 76/11 |
| 2019/0349965 | A1* | 11/2019 | Chakraborty | H04W 72/1284 |
| 2020/0053779 | A1* | 2/2020 | Jeon | H04B 7/0695 |
| 2020/0162203 | A1* | 5/2020 | Bang | H04W 72/14 |
| 2020/0220663 | A1* | 7/2020 | Tsai | H04L 1/1864 |
| 2020/0259599 | A1* | 8/2020 | Zhang | H04L 1/1671 |
| 2021/0044392 | A1* | 2/2021 | Myung | H04W 16/14 |
| 2021/0160917 | A1* | 5/2021 | Goto | H04W 72/0446 |
| 2021/0242980 | A1* | 8/2021 | Zhang | H04L 1/1896 |

OTHER PUBLICATIONS

3GPP TS 38.213; 3rd Generation Partnership Project; Technical Specification Group Radio Access Network; NR; "Physical Layer Procedures for Control"; Version 15.5.0; Mar. 2019; 104 pages.

Huawei et al., "Transmission with configured grant in NR unlicensed band", 3GPP TSG RAN WGI Meeting #96bis R1-1903931 Mar. 30, 2019 (Mar. 30, 2019), total 19 pages.

Vivo, "On NR carrier aggregation" 3GPP TSG RAN WGI Meeting #90bis R1-1717505 Oct. 3, 2017 (Oct. 3, 2017) section 2, total 5 pages.

* cited by examiner

METHOD FOR TRANSMISSION OF HARQ FEEDBACK IN GROUP COMMON DOWNLINK CONTROL INFORMATION

RELATED APPLICATIONS

The present application claims the benefit under 35 U.S.C § 119(e) of U.S. Provisional Patent Application Ser. No. 62/826,871, entitled "Method for Transmission of HARQ Feedback in Group Common Downlink Control Information", which was filed on Mar. 29, 2019, and which is incorporated herein by reference

FIELD

The present disclosure relates generally to wireless communications, and in particular embodiments, methods for transmission of hybrid automatic repeat request (HARQ) feedback in group common downlink control information.

BACKGROUND

In wireless communication systems, an electronic device (ED), such as a user equipment (UE), wirelessly communicates with a Transmission and Receive Point (TRP), termed "base station", to send data to the ED and/or receive data from the ED. A wireless communication from an ED to a base station is referred to as an uplink communication. A wireless communication from a base station to an ED is referred to as a downlink communication.

Resources are required to perform uplink and downlink communications. For example, an ED may wirelessly transmit data to a base station in an uplink transmission at a particular frequency and over a particular duration of time. The frequency and time duration used are examples of resources, and are sometimes called "time-frequency" resources. Other examples of resources or parameters for data transmission include modulation and coding scheme (MCS) used, reference signal such as demodulation reference signal (DMRS) for channel estimation, and transmit power ramping values used.

Wireless communication between a ED and a base station may occur on licensed spectrum, on unlicensed spectrum, or on both. Licensed spectrum refers to frequency bands that are licensed for use by designated telecommunication companies. A company licensing a particular frequency band has the right to wirelessly communicate using that frequency band in a given geographic area. Unlicensed spectrum refers to frequency bands that are not licensed for use by any companies, and that are free to be used by anybody in compliance with the regional spectrum regulations. When wirelessly communicating on unlicensed spectrum, there is an expectation that there may be interference from other devices also transmitting on the same resources in the unlicensed spectrum. Therefore, a device operating on unlicensed spectrum may use a listen before talk (LBT) protocol in which the device first listens to the wireless channel before sending a transmission.

Systems and methods are continuing to evolve to improve the reliability of wireless communication, and particularly uplink wireless communication, in unlicensed spectrum to enable mobile operators to at least partially offload continuously increasing traffic loads to available unlicensed spectrum resources using a unified/integrated carrier-type air interface. The Third Generation Partnership Project (3GPP) Rel-13 Long-Term Evolution (LTE)-based licensed-assisted access (LAA) to the unlicensed spectrum was specified to provide access to unlicensed component carriers (CCs), or secondary cells (SCells), through carrier aggregation (CA) with an anchor licensed primary CC, or primary cell (PCell), for downlink only transmission. Both uplink and downlink have been supported in subsequent releases, namely, Rel-14 enhanced LAA (eLAA) and Rel-15 further enhanced LAA (FeLAA).

In Rel-15 FeLAA, an autonomous uplink (AUL) transmission mode was specified to improve the UL performance in the unlicensed spectrum by bypassing the uplink scheduling procedure through activating and deactivating the uplink transmission based on configured grant parameters using DCI.

With additional transmissions and associated feedback acknowledging receipt of the transmissions occurring in the unlicensed spectrum, being able to reduce at least one of excess overhead, latency, and channel access attempts/contention, for the transmissions and the acknowledgement feedback would be helpful in maximizing resource efficiency.

SUMMARY

According to an aspect of the disclosure, there is provided a method involving: transmitting hybrid automatic repeat request (HARQ) acknowledgement feedback in a group common downlink control information (DCI) format to a dynamically selected subset of a semi-statically defined group of user equipment (UEs), the DCI format comprising a codebook of a semi-statically configured size.

In some embodiments, the HARQ acknowledgment feedback is a downlink feedback information (DFI) in relation to at least one configured grant transmission by at least one UE in the subset of UEs.

In some embodiments, wherein the HARQ acknowledgement feedback comprises one of: transmission block (TB) level feedback; or a combination of TB level feedback and code block group (CBG) level feedback.

In some embodiments, the method further involves dynamically selecting the subset of UEs based on one or more of: the semi-statically configured size of the codebook in the DCI format; a size of a TB level indication bitmap per UE; a number of TBs for which CBG level feedback that is indicated that is provided for each dynamically selected UE; a size of a CBG level indication bitmap per TB; and a semi-statically configured size of a CBG level indication bitmap per dynamically selected UE.

In some embodiments, the size of the TB level indication bitmap per UE is determined by a number of HARQ processes configured by a higher layer per UE for uplink transmission in an active BWP.

In some embodiments, the size of the CBG level indication bitmap per TB is determined by a number of CBGs per TB configured to the UE by a higher layer.

In some embodiments, the group of UEs is based upon at least one of: selecting UEs that have been configured with same time domain resources and same frequency domain resources; selecting UEs that have been configured with same time domain resources and orthogonal frequency domain resources, e.g., non-overlapping allocations of resource blocks (RBs) or frequency interlaces; selecting UEs that have been configured with CBG based transmission, or retransmission, on configured grant resources; selecting UEs that are transmitting traffic with same channel access priority class (CAPC) index; and selecting UEs having a same active resource configuration when a set of multiple active resource configurations per bandwidth part (BWP) is predefined.

In some embodiments, the method further involves transmitting higher level configuration information to UEs in the group of UEs that includes one or more of: a group common radio network temporary identifier (RNTI) associated with the group of UEs; a logical index indicator for the UE to determine, a bit position in the group common DCI format, the bit indicates whether the UE is dynamically selected to receive HARQ acknowledgement feedback; and a size for the codebook to be used in the DCI format.

In some embodiments, the method further involving transmitting higher layer configuration information to UEs in the group of UEs that includes: configuration of a search space set and a corresponding control resource set (CORESET) for monitoring physical downlink control channel (PDCCH) candidates for the group common DCI format comprising the codebook of the semi-statically configured size.

In some embodiments, transmitting HARQ acknowledgement feedback using the group common DCI format comprises transmitting the DCI format having a cyclic redundancy check (CRC) that is scrambled by a radio network temporary identifier (RNTI) associated with the semi-statically defined group of UEs.

In some embodiments, transmitting the DCI format involves transmitting: a first block of N bits, where N is equal to the number of UEs in the semi-statically defined group of UEs, each bit used to indicate if a UE associated with the bit is dynamically selected to receive HARQ acknowledgement feedback; and a second block of M groups of bits, each group of bits defining a bitmap of HARQ feedback associated with a respective UE identified in the first block of N bits and indicated to receive HARQ acknowledgement feedback, each bit in a respective group corresponding to HARQ acknowledgement feedback for a particular HARQ process.

In some embodiments, a size of the M groups of bits is the same for each of the M groups based on the number of HARQ processes.

In some embodiments, the size of the TB level indication bitmap per UE is determined by a number of HARQ processes configured by a higher layer per UE for uplink transmission in an active BWP.

In some embodiments, transmitting the DCI format further involves transmitting: a third block of P groups of bits, each group of bits defining a bitmap of HARQ acknowledgement feedback for each CBG of a plurality of CBGs in a transmission block transmitted by a UE and corresponding to the particular HARQ process, each group of bits associated with a TB for a UE identified in the first block of N bits indicated to receive HARQ acknowledgement feedback.

In some embodiments, the size of the CBG level indication bitmap per TB is determined by a number of CBGs per TB configured to the UE by a higher layer.

In some embodiments, a size of the third block of P groups of bits is determined dynamically based in part on a number of UEs indicated to receive HARQ acknowledgement feedback in the first block of N bits and a number of negative acknowledgements (NACKs) indicated for each UE associated with one of the M groups of bits in the second block.

In some embodiments, the base station indicates: a valid NACK for a given HARQ process for a UE associated with one of the M groups of bits in the second block only after a minimum downlink feedback information (DFI) delay from the end of a detected (re)transmission of the corresponding TB on PUSCH if the base station has failed to decode that TB; or an ACK for the given HARQ process.

In some embodiments, each of the P groups of bits are equal in size and zero-padding bits, if appropriate, are inserted in locations in each group of bits not used for HARQ acknowledgement feedback.

In some embodiments, a size of each of the P groups of bits is based on the number of NACKs indicated for each UE associated with one of the M groups of bits in the second block and a number of CBGs per TB and zero-padding bits, if appropriate, are inserted subsequent to the third block of P groups of bits.

According to another aspect of the description there is provided an apparatus including a processor and a computer-readable medium having stored thereon computer-implemented instructions. The computer-implemented instructions, when executed by the processor cause the apparatus to transmit hybrid automatic repeat request (HARQ) acknowledgement feedback in a group common downlink control information (DCI) format to a dynamically selected subset of a semi-statically defined group of user equipment (UEs), the DCI format comprising a codebook of a semi-statically configured size.

According to another aspect of the disclosure, there is provided a method for a user equipment (UE) that is part of a semi-statically defined group of UEs receiving hybrid automatic repeat request (HARQ) acknowledgement feedback, the method involving: the UE receiving the HARQ acknowledgement feedback in a group common downlink control information (DCI) format, the DCI format comprising a codebook of a semi-statically configured size.

In some embodiments, the HARQ acknowledgment feedback is a downlink feedback information (DFI) in relation to configured grant transmission by at least one UE in the subset of UEs.

In some embodiments, the HARQ acknowledgement feedback includes one of: transmission block (TB) level feedback; or a combination of TB level feedback and code block group (CBG) level feedback.

In some embodiments, the method further involves: receiving higher layer configuration information that includes one or more of: a group common radio network temporary identifier (RNTI) associated with the group of UEs of which the UE is part thereof; a logical index indicator for the UE to determine, a bit position in the group common DCI format, the bit indicates whether the UE is dynamically selected to receive HARQ acknowledgement feedback; and a size for the codebook to be used in the DCI format.

In some embodiments, the method further including: receiving configuration information that includes: configuration of a search space set and a corresponding control resource set (CORESET) for monitoring physical downlink control channel (PDCCH) candidates for the group common DCI format comprising the codebook of the semi-statically configured size.

In some embodiments, receiving HARQ acknowledgement feedback using the group common DCI format comprises receiving the DCI format having a cyclic redundancy check (CRC) that is scrambled by a radio network temporary identifier (RNTI) associated with the semi-statically defined group of UEs.

In some embodiments, the method further includes descrambling the received DCI format using the RNTI associated with the group of UEs involves receiving: a first block of N bits, where N is equal to the number of UEs in the semi-statically defined group of UEs, each bit used to indicate if a UE associated with the bit is dynamically selected to receive HARQ feedback; and a second block of M groups of bits, each group of bits defining a bitmap of HARQ feedback associated with a UE identified in the first block of N bits and indicated to receive HARQ acknowledgement feedback, each bit in a respective group corresponding to HARQ acknowledgement feedback for a particular HARQ process.

In some embodiments, a size of the M groups of bits is the same for each of the M groups based on the number of HARQ processes.

In some embodiments, receiving the DCI format further comprises receiving: a third block of P groups of bits, each group of bits defining a bitmap of HARQ feedback for each CBG of a plurality of CBGs in a transmission block (TB) transmitted by the associated UE and corresponding to the particular HARQ process, each group of bits associated with a TB for a UE identified in the first block of N bits indicated to receive HARQ acknowledgement feedback.

In some embodiments, a size of the third block of P groups of bits is based in part on a number of UEs indicated to receive HARQ feedback in the first block of N bits and a number of valid negative acknowledgements (NACKs) indicated for each UE associated with one of the M groups of bits in the second block.

In some embodiments, each of the P groups of bits are equal in size and zero-padding bits, if appropriate, are included in locations in each group of bits not used for HARQ feedback.

In some embodiments, a size of each of the P groups of bits is based on the number of valid NACKs indicated for each UE associated with one of the M groups of bits in the second block and a number of CBGs per TB and zero-padding bits, if appropriate, are inserted subsequent to the third block of P groups of bits.

In some embodiments, the UE uses the HARQ acknowledgement feedback for determining a contention window size (CWS) adjustment for category 4 listen before talk (CAT-4 LBT) channel access procedure operation in a cell with shared spectrum access.

In some embodiments, the UE determines that a HARQ feedback for each HARQ process is valid when the feedback has been received on a PDCCH after a configurable minimum DFI delay from the end of a (re)transmission of a corresponding TB on a physical uplink shared channel (PUSCH) and the UE disregards the HARQ feedback otherwise.

According to another aspect of the description there is provided a User Equipment (UE) including a processor and a computer-readable medium having stored thereon computer-implemented instructions. The computer-implemented instructions, when executed by the processor cause the apparatus to receive a HARQ acknowledgement feedback in a group common downlink control information (DCI) format, the DCI format comprising a codebook of a semi-statically configured size.

BRIEF DESCRIPTION OF THE DRAWINGS

Embodiments of the present disclosure will be described in greater detail with reference to the accompanying drawings.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of this disclosure provide a compact semi-static codebook design for dynamic indication of HARQ acknowledgement feedback in a downlink feedback information (DFI) for transmission with configured grant in the unlicensed spectrum. Although aspects of the disclosure are generally applicable for use with configured grant transmissions, it is to be understood that the general principles described herein may also apply to other forms of communication. The codebook design enables a code block group (CBG) based operation for New Radio Unlicensed (NR-U) configured grant. Aspects of the disclosure may provide reduced signaling overhead, reduced latency, and reduced channel access attempts/contention.

Turning now to the figures, some specific example embodiments will be described.

Communication System

Figure 1:
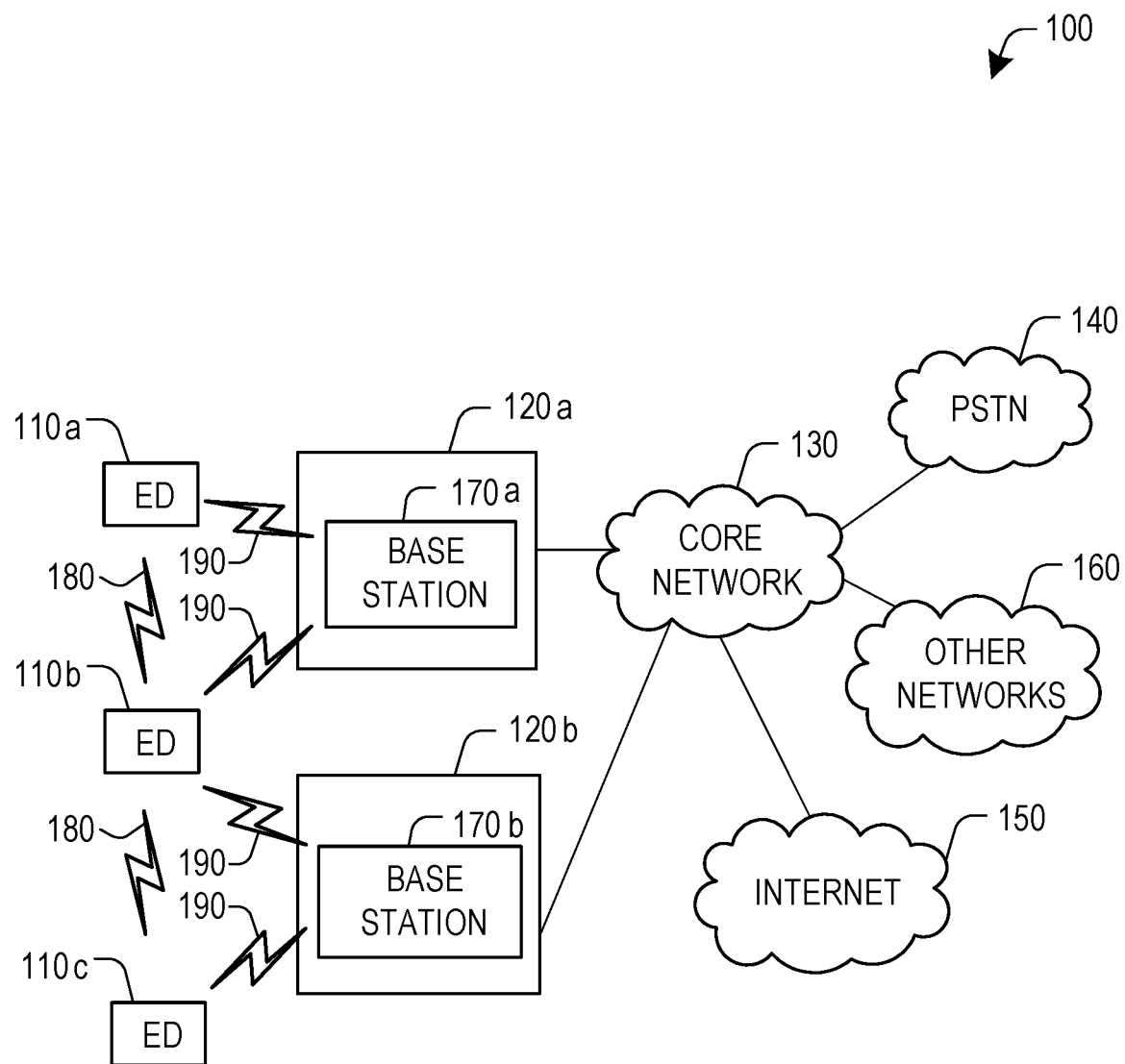
FIG. 1 is a schematic diagram of a communication system in which embodiments of the disclosure may occur.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c, or both, and (ii) other networks (such as the PSTN 140, the internet 150, and the other networks 160).

The EDs 110a-110c may communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communicate with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180.

In some embodiments, the air interfaces 190 or the SL air interfaces 180, or both, may be, at least in part, implemented over unlicensed spectrum.

The transmissions between the base station and UEs and between UEs on the SL links may be "grant-free" transmissions or as a mode for data transmissions that are performed without communicating dynamic scheduling. Grant-free transmissions are sometimes called "configured grant", "grant-less", "autonomous", "schedule free", or "schedule-less" transmissions. Grant-free transmissions can also be referred to as "transmission without grant", "transmission without dynamic grant", "transmission without dynamic scheduling", "transmission using configured grant", or "autonomous transmission", for example.

A configured grant transmission typically requires the receiver to know the parameters and resources used by the transmitter for the transmission. However, in the context of SL transmissions, the receiving UE is typically not aware of the transmitting UE's configuration parameters, such as which UE is transmitting, the ultimate target of the data (e.g., another UE), the time-domain and frequency-domain communication resources used for the transmission, and other control information. Various methods may be used to provide the configuration parameters and control information necessary for enabling configured grant transmissions in SL. The various methods will, however, each incur a respective overhead penalty. Embodiments of the present disclosure comprise including at least some of those configuration parameters and/or control information in the SL configured grant transmission, which may provide performance and/or overhead benefits.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support such.

Figure 2A:
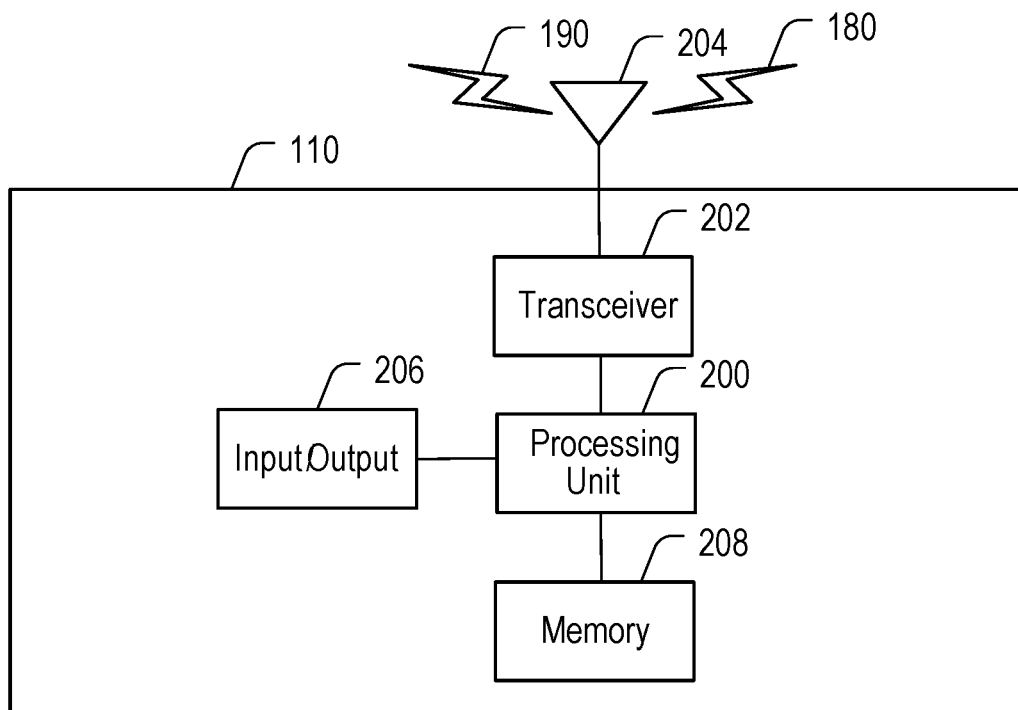
FIGS. 2A and 2B are block diagrams of an example ED and base station, respectively.
Figure 2B:
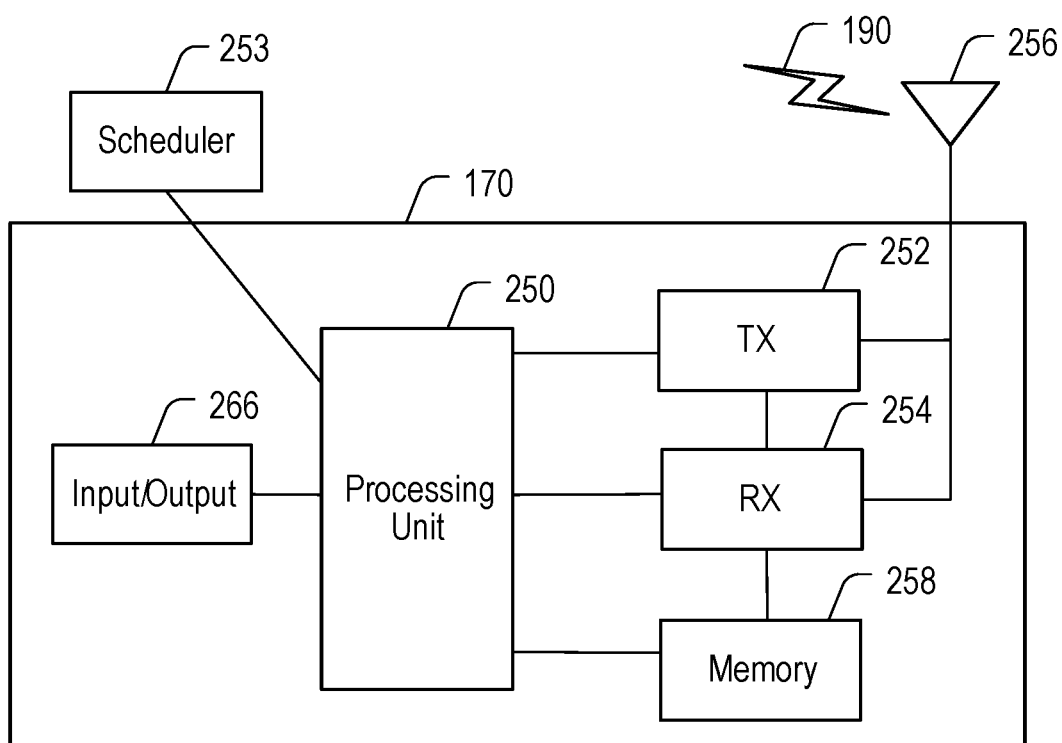

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Unlicensed Spectrum Access

Given the scarcity and expense of bandwidth in the licensed spectrum, and the increasing demand for data transmission capacity, there is increasing interest in offloading at least some communication traffic, such as uplink communication traffic, to the unlicensed spectrum. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary.

Licensed-Assisted Access (LAA) and enhanced LAA (eLAA) of 3GPP Rel-13 and Rel-14, respectively, are aimed at porting the spectral-efficient mobile broadband (MBB) air interface (AI) to the vast and free-of-charge unlicensed spectrum through aggregating unlicensed component carriers (CCs) at the operator's small cells with the assistance of the anchor licensed carriers.

However, UL transmission in eLAA has been built around the grant based (GB) scheme only. To present a global unlicensed solution, regulatory requirements such as Listen-Before-Talk (LBT) have to be imposed on the medium access design. As such, UL transmission in eLAA has been disadvantaged in terms of latency and successful medium access opportunities due to the multiple contention levels for:
the ED to transmit the scheduling request (SR) e.g., in standalone (SA) deployments, i.e., without an anchor licensed cell;
the base station to schedule the ED among other EDs;
the base station to transmit the scheduled grant (especially for self-carrier scheduling); and
the ED to pursue the GB transmission.

When wirelessly communicating on unlicensed spectrum, there is an expectation that the time-frequency resources allocated for downlink and/or uplink transmissions may be occupied by other coexisting transmitters/systems, which may cause interference. Therefore, a device operating on unlicensed spectrum may use a listen before talk (LBT) protocol in which the device first listens to the wireless channel to determine the availability of the channel, before sending a transmission. The wireless channel may sometimes be referred to as the medium.

For example, before a UE or network-side device, referred to hereafter as simply a device for simplicity, sends an uplink transmission on particular frequency resources, e.g. on a particular active BWP or portion thereof, the device may listen to the wireless channel on those frequency resources. The device may listen for a configured or randomly generated duration of time before sending the uplink transmission. For example, the device may listen over multiple clear channel assessment (CCA) time slots to determine whether another transmission is already occurring on the frequency resources. If another transmission is already occurring, then the channel is said to be occupied, busy or acquired. If the device detects that the channel is already occupied, the device will not send the uplink transmission on the allocated resource. If the device determines that the channel is unoccupied, i.e. that the channel is idle (which may also be referred to as "free"), then the device acquires the channel and sends the uplink transmission. However, there still may be a collision due to the hidden node problem, e.g. if another UE or base station that is too far from the device to be sensed also transmits concurrently causing interference at the serving base station.

A transmission that is sent using an LBT protocol may be referred to as an "LBT-based transmission". Different LBT protocols may be used to perform LBT-based transmissions, e.g. LBT category 2 ("LBT CAT2" also known as "One-shot LBT" or "Short LBT"), LBT category 4 ("LBT CAT4"), etc. An "LBT failure" is said to occur when the channel is occupied. When LBT failure occurs, the transmission is cancelled or deferred. The time delay incurred because of an LBT failure is referred to as blocking time.

In eLAA and Rel-15 further enhanced LAA FeLAA, when a percentage of negative acknowledgements (NACKs) received for transmissions on a transmission resource (Z) is greater than or equal to a threshold percentage of the total number of acknowledgements, e.g. 80%, a contention window size (CWS) for a subsequent UL transmission may be adjusted to a larger value than a current CWS. Conversely, when a percentage of negative acknowledgements (NACKs) received for a transmission on a transmission resource is less than or equal to the threshold percentage of the total number of acknowledgements, a CWS for a subsequent UL transmission may be adjusted to a smaller value than a current CWS, e.g., reset to a minimum value, $CW_{min}$ corresponding to the channel access priority class of the UL transmission.

3GPP has specified the 5G New Radio (NR) air interface in Rel-15 in which uplink transmission with configured grant (CG) in the licensed band has been specified using either a Type 1 or Type 2 mechanism. However, identification of the HARQ process ID and thus the associated transport block (TB) is based on the time domain resources occupied by the uplink transmission. Although the motivation therein was to support the uplink transmission of ultra-reliable low-latency communication (URLLC) traffic, later on, a study item on the NR-based access to the unlicensed spectrum (NR-U) concluded that enhancements based on NR Type 1 or Type 2 transmissions with CG should be studied.

Unlike NR R-15 uplink transmission with CG, R-15 autonomous uplink (AUL) supports fully asynchronous HARQ due to the operation in the unlicensed spectrum. As such, AUL introduced explicit HARQ-ACK feedback in DCI, namely Downlink Feedback Information (DFI), matching the size of the activation DCI format. AUL-DFI is a UE-specific DCI and carries a fixed-size bitmap of a length equal to the maximum number of HARQ processes configurable to a UE for AUL transmission, i.e., 16 bits. Each bit carries the TB level HARQ-ACK feedback for the corresponding HARQ process; for example, a "1" is an ACK and a "0" is a NACK (if the HARQ process is in use by the UE and feedback is expected).

As wireless communications processes continue to evolve and UL traffic loads and additional traffic types continue to increase, New Radio Unlicensed (NR-U) has been proposed to help handle increased transmission resource demand. In some implementations configured grant (CG) processes in NR-U have been considered to avoid excessive LBT overhead with scheduled UL. Therefore, at any given time, many UEs may be configured to use NR-U CG. This may result in frequent transmission of UE-specific DFIs. Even if only a single HARQ process is due for feedback for a specific UE, a whole DFI is transmitted. This may result in lower transmission efficiency as there are resources allocated for such overhead information, which is not being utilized.

Figure 8:
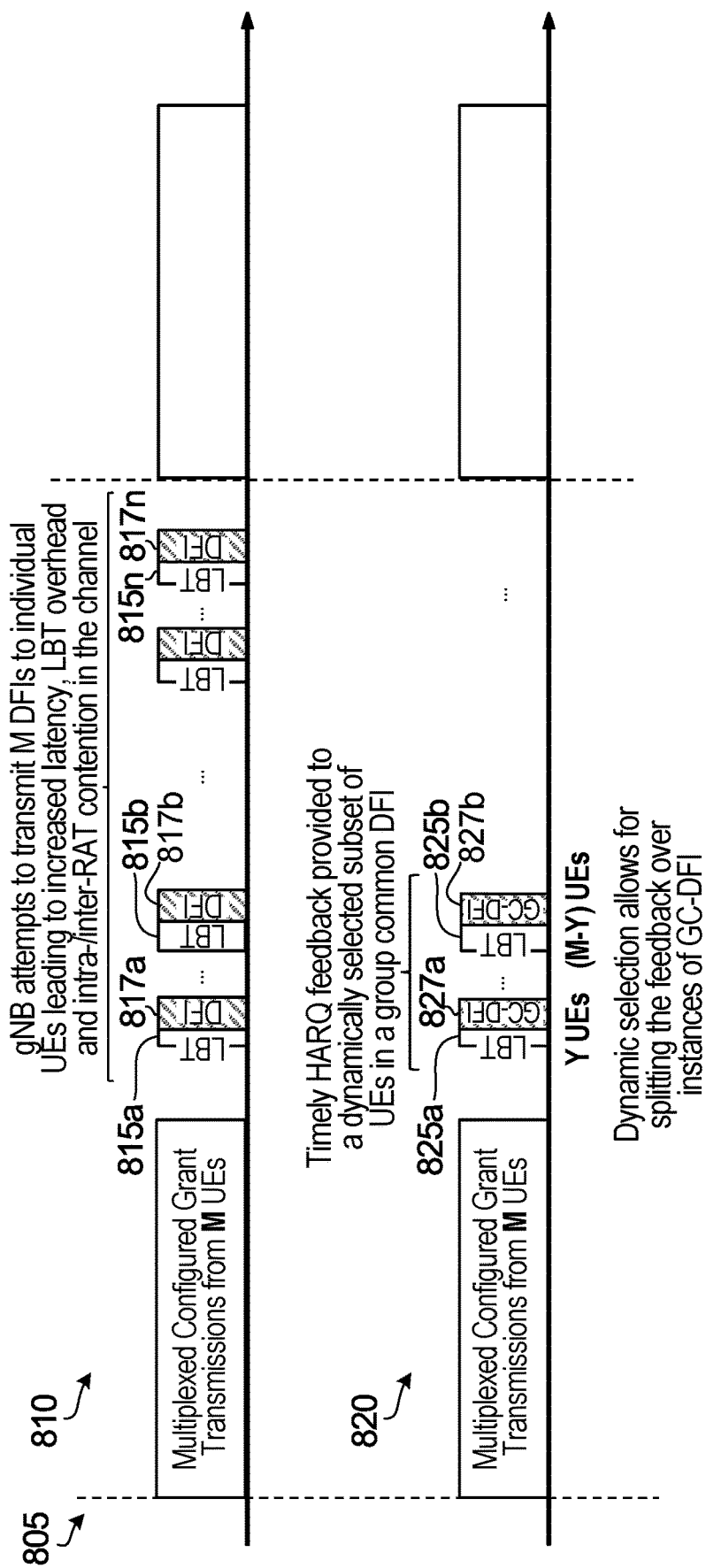
FIG. 8 is a schematic timing diagram of an example comparison between providing HARQ feedback to multiple UEs individually and providing HARQ feedback to multiple UEs using a group common addressing mechanism according to embodiments of the present disclosure.

The future of wireless communications is expected to result in large transmission block (TB) sizes, in particular with enhanced mobile broadband (eMBB) traffic. It is also expected that multiple UEs will be configured with same time-domain resources. In such situations, providing immediate or timely feedback to individual UEs will be challenging due to multiple channel access attempts that may be performed by each base station. FIG. 8 illustrates a comparison between a base station providing HARQ feedback to multiple UEs individually 810 and the base station providing HARQ feedback to multiple UEs using a group common addressing mechanism 820 according to embodiments of the present disclosure. The horizontal axis of each example is increasing time. The duration of time between dashed lines 805 and 807 is a period of time in which the base station detects potential CG transmissions from one or more UEs and then responds with HARQ feedback. Prior to the base station providing HARQ feedback to multiple UEs individually 810 or the base station providing HARQ feedback to multiple UEs using a group common addressing mechanism 820, a portion of the resource is shown to include multiplexed configured grant transmission from multiple M UEs to the base station. For the scenario of the base station providing HARQ feedback to multiple UEs individually 810, for each UE the base station performs LBT 815a, 815b, 815n and before transmitting the DFIs 817a, 817b, 817n, respectively. For the scenario of the base station providing HARQ feedback to multiple UEs using a group common addressing mechanism 820, for a first group Y of the M UEs, the base station performs LBT 825a and then transmits the DFI 827a and then for a second group, the remaining Y-M UEs, the base station performs LBT 825b and then transmits the DFI 827b. As compared to the base station transmitting the DFI for each UE individually 810, transmitting using group common signaling 820 for ACK/NACK feedback may achieve savings in signaling overhead, LBT overhead, and UE energy consumption. For instance, the base station can provide pending HARQ feedback for one or more TBs each transmitted in a respective PUSCH that was transmitted with configured grant within previous uplink channel occupancy times (UL COTs), e.g., before the time point 805, using a group common downlink feedback information (GC-DCI) format scrambled with a group radio network temporary identifier (RNTI). In FIG. 8, for a group of UEs configured with the same time-domain resources and with either orthogonal or non-orthogonal frequency-domain resources, the HARQ feedback is needed concurrently. The base station can thus provide the HARQ feedback simultaneously for the group of UEs using the group common DFI (GC-DFI) without incurring the latency and LBT overhead associated with sending individual UE-specific DFIs.

This technique may also result in reducing the contention in the unlicensed channel and hence improving both intra- and inter-radio access technology (RAT) coexistence. More-over, cyclic redundancy check (CRC) overhead may be much less significant when applied to the group common DFI as compared to each individual DFI.

Wideband (WB) operations of NR-U may also present particular problems to be addressed. For example, WB transmission blocks spanning multiple 20 MHz subbands are subject to puncturing upon LBT failure on corresponding subbands. Code block group (CBG)-based transmission, or retransmission, and CBG level HARQ-ACK feedback may be a beneficial way to address such issues.

Aspects of the present disclosure may involve introducing a new DFI codebook design, a new DCI format, associated radio resource control (RRC) configuration parameters and UE procedures that can be used in NR-U. In some embodiments, the DFI codebook may be of use for providing HARQ feedback with configured grant transmissions. Some embodiments of the disclosure may aid in reducing signaling overhead by grouping HARQ-ACK feedback from a dynamically selected number of UEs. Being able to select the UEs in a dynamic manner allows for the possibility of not having to use a codebook that is provisioned to have a size that can accommodate a worst case scenario in which all the UEs are allocated a portion of the codebook for HARQ feedback of all of the available HARQ processes, and if enabled, all the CBGs per transmit block (TB). It is assumed that statistically speaking only a portion of the UEs will be provided HARQ feedback information, and only a portion of the active HARQ processes of such UEs would incur a TB level NACK and result in CBG level HARQ feedback, if enabled. It should be understood that an active HARQ process is a HARQ process that the UE has used to (re) transmit a TB and the TB still exists in the UE's buffer for potential retransmissions/repetitions. Not having to provision HARQ feedback space for all UEs of the group allows for a reduction in the number of bits used for provisioning, resulting in less overhead and a result should be higher transmission efficiency. Some embodiments of the disclosure may reduce LBT overhead at the base station due to fewer channel access attempts thus reducing the contention in the unlicensed channel and hence improving both intra-RAT and inter-RAT coexistence. Some embodiments of the disclosure may enable immediate or pending feedback to be carried simultaneously to a subset of the frequency-multiplexed UEs configured with same time domain resources and thus reducing latency, as opposed to the base station sending feedback to each UE individually. Some embodiments of the disclosure may support mixed TB level and CBG level HARQ-ACK feedback. Some embodiments of the disclosure may enable a compact codebook design by dynamically providing CBG level feedback for a selected number of HARQ processes for a selected number of UEs. At least some of the embodiments described above may be provided while maintaining a configurable fixed-size group common DFI field to simplify the UE's blind detection.

Figure 3:
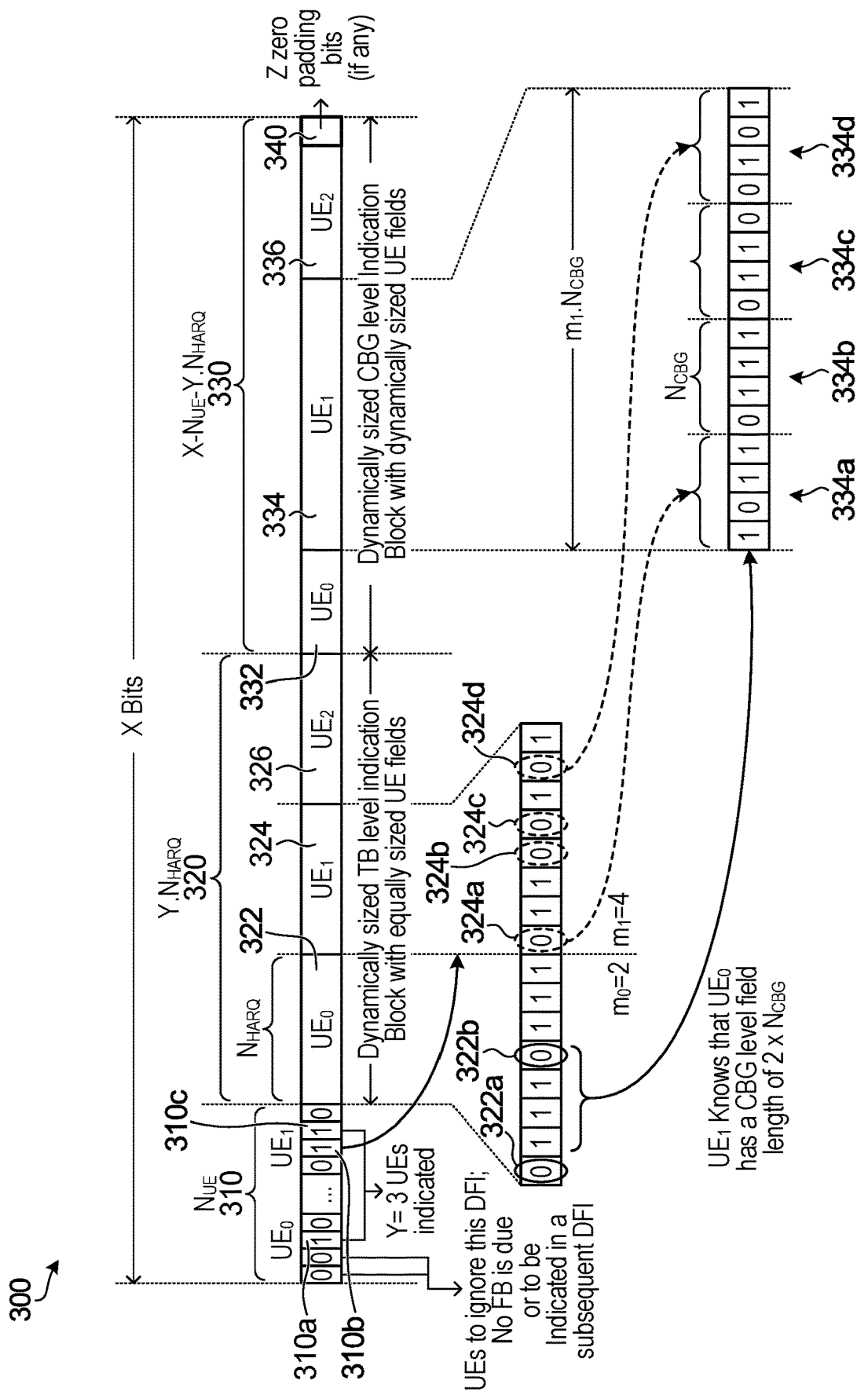
FIG. 3 is a schematic diagram of a dynamic indication in a semi-static codebook for use in forwarding HARQ feedback to at least one user equipment (UE) in a semi-statically selected group of UEs according to a first embodiment.
Figure 4:
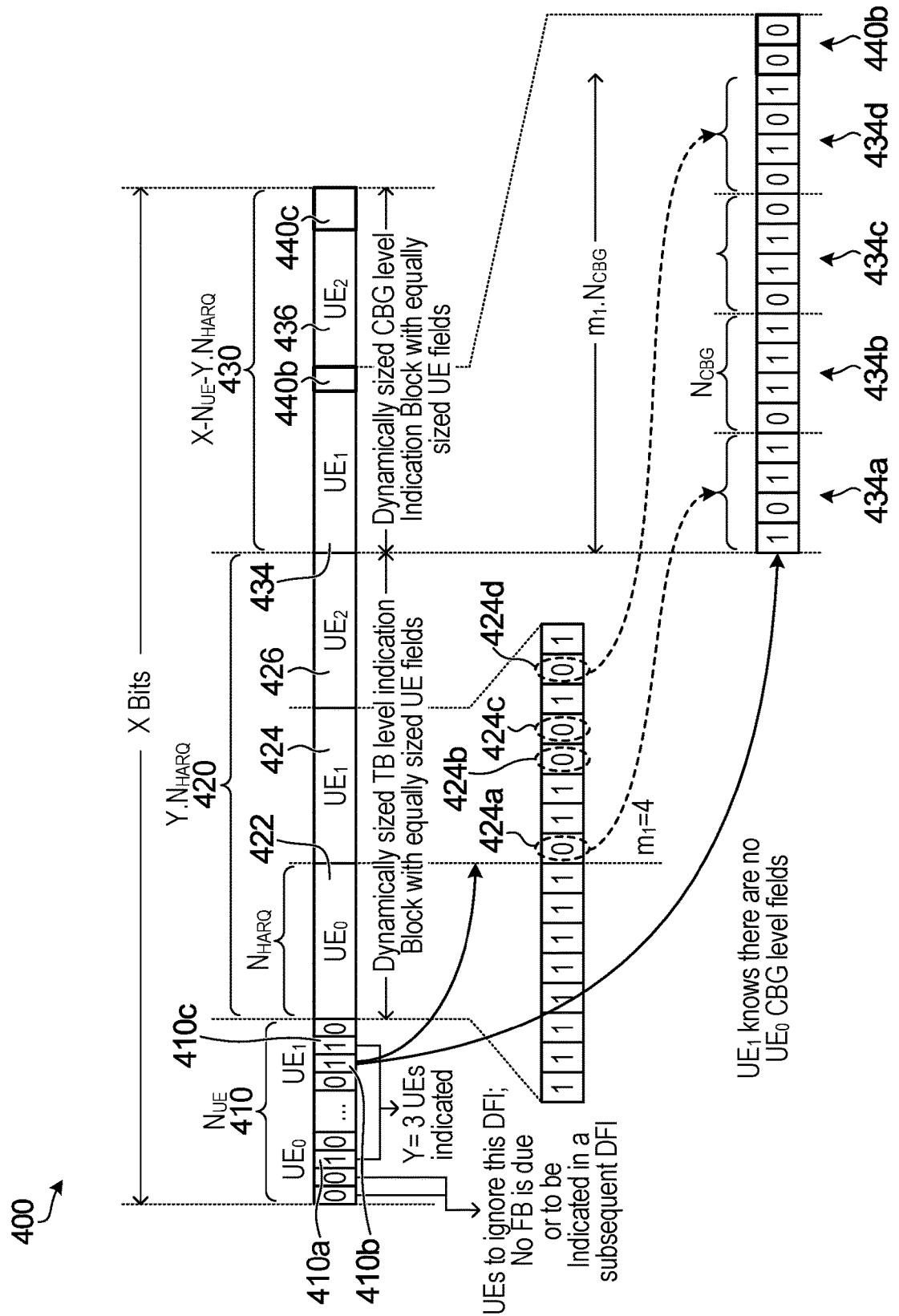
FIG. 4 is a schematic diagram of a dynamic indication in a semi-static codebook for use in forwarding HARQ feedback to at least one UE in a semi-statically selected group of UEs according to a second embodiment.
Figure 5:
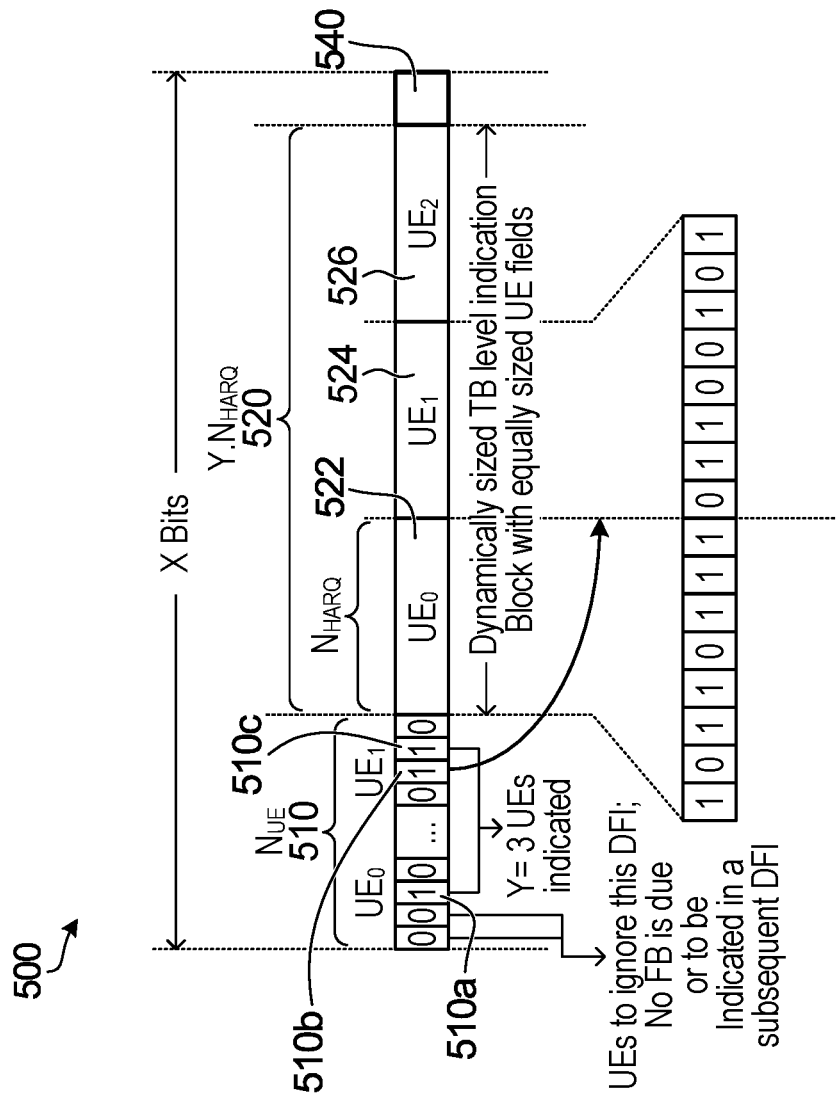
FIG. 5 is a schematic diagram of a dynamic indication in a semi-static codebook for use in forwarding HARQ feedback to at least one user equipment (UE) in a semi-statically selected group of UEs according to a third embodiment.

FIGS. 3, 4 and 5 are three different examples of a dynamic indication in a semi-static codebook that may be used to transmit HARQ acknowledgement feedback as downlink feedback information (DFI) in a downlink control information (DCI) format. The DCI format is a group common DCI format. The expression "group common" meaning that the DCI format is used to send information to a group of UEs on a resource in a search space that is known to be common, or accessible, to all members of the group, wherein a scrambling RNTI is specific to the group of UEs. The codebooks described in the examples of FIGS. 3, 4 and 5 are all assumed to be for groups of UEs, each group having a size of $N_{UE}$ UEs. The groups of UEs are semi-statically selected.

A subset of the group can be dynamically selected to be provided HARQ feedback information in the codebook. In some embodiments, a dynamic indication in a semi-static codebook as described by the examples of FIGS. 3, 4 and 5 is transmitted by a base station to the semi-statically selected group of UEs to provide HARQ-ACK feedback using a group common DCI format.

Dynamic Indication Signaling Mechanism with Dynamic Sized CBG Level Bitmaps

FIG. 3 illustrates an example of a configurable fixed length codebook used for identifying, for each UE of the group of semi-statically selected UEs, a subset of dynamically selected UEs that are being provided HARQ and then providing the appropriate feedback to that subset of UEs. The UEs in the group receiving the codebook would receive the codebook as part of DCI that is addressed with a group common downlink feedback information radio network temporary identifier (GC-DFI-RNTI) that was configured to all the UEs in the group so that each UE in the group could identify and decode the DCI format. The codebook has a configurable fixed length of X bits. In some embodiments, each UE can be semi-statically configured (separately or in a same higher layer configuration message with configuration information that configures the UEs regarding the DCI format) with a size for the codebook to be used in the DCI format. In some embodiments, the base station may select the size from a set of predefined sizes. The selection may be based on the size of the semi-statically defined group of UEs and whether CBG level feedback is enabled or not.

The number of the first set of $N_{UE}$ bits 310 corresponds to the number of semi-statically selected UEs in the group. Subsequent to the first $N_{UE}$ bits, there is a transmission block (TB) level block of bits 320, the TB level block containing Y groups 322, 324, 326 of $N_{HARQ}$ bits, for a total of $Y*N_{HARQ}$ bits, where $N_{HARQ}$ is a number of HARQ processes configured per UE and Y is the number of dynamically selected UEs in the first $N_{UE}$ bits 310 that are indicated to be provided with HARQ feedback. Each of the Y groups 322, 324, 326 of $N_{HARQ}$ bits may be considered to be a TB level bitmap. The value of $N_{HARQ}$ is the same for each of the bitmaps in the TB level block 320 of bits. A remainder of the X bits, which would be equal to $X-N_{UE}-Y*N_{HARQ}$, is a code block group level block of bits 330 that are used to indicate HARQ feedback for the $N_{CBG}$ code block groups (CBGs) per TB for respective UEs. A group of bits 332, 334, 336 for each UE being provided CBG level HARQ feedback may be considered a CBG level bitmap. The size of a CBG level bitmap for a UE is proportional to a number of negative acknowledgements (NACKs) received in the TB level bitmap for the UE. The CBG level bitmaps 332, 334, 336 for the UEs being provided feedback follow one another sequentially with no gaps between the CBG level bitmaps. Any unused bits following the last CBG level bitmap 340 in the configurable fixed length codebook 300 can be zero padded to fill out the CBG level block to reach the total number of X bits.

In some embodiments, the dynamic selection of the subset of UEs is based on one or more of: the semi-statically configured fixed size of the codebook in the DCI format; a size of a TB level indication bitmap per UE (i.e. the number of HARQ processes); a number of TBs for each CBG level feedback for each dynamically selected UE in the selected group of UEs; and a size of a CBG level indication bitmap per TB.

The HARQ feedback for a UE being provided feedback includes TB level feedback bits or a combination of TB level and CBG level feedback bits.

A UE configured with the corresponding GC-DFI-RNTI value can determine whether or not the UE is indicated in the current instance of the DFI to be provided HARQ feedback. The UE can determine if a bit in the first $N_{UE}$ bits corresponding to an index associated with the UE is set to indicate HARQ feedback or not. The index associated with the UE may be provided to the UE in a higher layer configuration message, e.g., RRC, defining such a UE index relationship. As such, for a group of Y UEs, i=0 to Y−1, the $i^{th}$ indicated UE determines that the TB level indication field for that UE will start after $N_{UE}+i*N_{HARQ}$ bits from the beginning of the codebook and spans a length of $N_{HARQ}$ bits.

Using the total number of zeros (TB level HARQ NACKs) from a beginning of the TB level block to the beginning of the TB level field of the $i^{th}$ indicated UE, the $i^{th}$ indicated UE determines that its CBG level HARQ feedback indication field starts after $N_{UE}+Y \cdot N_{HARQ}+\Sigma_{j=0}^{i-1} m_j N_{CBG}$ bits and spans $m_i*N_{CBG}$, where Y is the total number of the dynamically indicated UEs, where $m_i$ is the number of "0"s in the TB level bitmap of the $i^{th}$ indicated UE.

If the TB level bitmap contains no zeros for a given indicated UE, that UE has no bits carrying CBG level feedback within the CBG level block.

By dynamically selecting a subset of UEs within a semi-statically defined group of UEs, embodiments of the disclosure may have a reduced need to provision a fixed codebook size of X bits for the worst case, i.e., $N_{UE}*N_{HARQ}*N_{CBG}$.

In FIG. 3 the configurable fixed length codebook 300 has X bits. In the example, the group of the first $N_{UE}$ bits 310 is shown to include a mixture of and '0's. A '1' is representative that a UE associated with the particular index of the first $N_{UE}$ bits has been dynamically selected to be provided with feedback in a current instance of the group common DFI transmission. The association between UE and index can be configured by higher layer signaling. A '0' is representative that a UE associated with the particular index of the first $N_{UE}$ bits will not be provided with feedback in the current instance of the group common DFI transmission. UEs that receive the DCI format containing the codebook and receive a '0' can therefore ignore the remainder of the content because there is no feedback for those UEs. UEs that receive the DCI format containing the codebook and receive a '1' can determine where in the codebook that the feedback is located, as described in detail above The UEs can also be configured with an identification of the number of UEs in the semi-statically determined group of UEs, i.e. the value of $N_{UE}$. The identification of $N_{UE}$ can be configured by higher layer signaling.

Referring to FIG. 3, there are three bits 310a, 310b and 310c in the first set of $N_{UE}$ bits 310 that are '1's. The UEs that are associated with bits being set to '1' of the first $N_{UE}$ bits 310 are then associated with the identifiers $UE_0$, $UE_1$ and $UE_2$ for the sake of further description with regard to discussion of the UEs receiving feedback in the codebook of FIG. 3. The identification of the indices for $UE_0$, $UE_1$ and $UE_2$ are not intended to correspond to the semi-statically configured indices of UEs within the first $N_{UE}$ bits of the codebook.

Because there are three UEs indicated to be provided HARQ feedback, there are three TB level bitmaps indicated by reference characters 322, 324 and 326, each having $N_{HARQ}$ bits. The number of $N_{HARQ}$ bits in FIG. 3 is 8 bits. However, it is to be understood that this is merely an example and the value of $N_{HARQ}$ bits can be any appropriate value, e.g., 16 bits. Therefore, for each UE that has been indicated to receive feedback, there are eight possible HARQ processes that could be provided with an acknowledgement (ACK) or negative acknowledgement (NACK).

A detailed view of the bits in TB level bitmaps 322 and 324 is shown to include a mixture of '1's and '0's. To the respective UE, a '1' may have a different meaning depending when the HARQ process is in active use and due for feedback or when the HARQ process is not in active use or due for feedback. The HARQ process may not be due for feedback based on a configurable/pre-defined minimum DFI delay parameter such as minimum PUSCH-to-HARQ feedback timing, i.e. feedback may not be possible as there has not been sufficient time to process a (re)transmission. When the HARQ process is in active use and due for feedback, a '1' is representative of a particular HARQ process associated with the particular index of the $N_{HARQ}$ bits in the bitmap being provided with a positive acknowledgement (ACK) of receipt for a transmission of the TB associated with that HARQ process. Typically, the TB level bitmap is ordered from most significant bit (MSB) to least significant bit (LSB) from HARQ process ID 0 to 15. A '0' is representative of a particular HARQ process associated with the particular index of the $N_{HARQ}$ bits in the bitmap being provided with a valid negative acknowledgement (NACK) of receipt for a transmission of the TB associated with that HARQ process. In other words, the base station indicates a TB level NACK for a given HARQ process only after the minimum DFI delay from the end of a detected (re)transmission of the corresponding TB on PUSCH if the base station has failed to decode that TB. The base station indicates a 1' for the given HARQ process otherwise. In the example of FIG. 3, as it is assumed that the HARQ processes are active and due for feedback, for $UE_0$ the second, third, fourth, sixth, seventh and eighth bits of TB level bitmap 322 are '1', indicating an ACK for those HARQ processes. The first 322a and fifth 322b bits are '0', indicating a NACK. For $UE_1$ the second, third, sixth, and eighth bits of TB level bitmap 324 are '1', indicating an ACK for those HARQ processes and the first 324a, fourth 324b, fifth 324c, and seventh 324d bits are '0', indicating a NACK.

$UE_0$ is able to determine where it will start to receive the TB level feedback information for $UE_0$ based on the fact that $UE_0$ is the first UE indicated to correspond to the first block of $N_{UE}$ bits. $UE_1$ is able to determine where it will start to receive the TB level feedback information for $UE_1$ based on the fact that it knows how many UEs are in the group and therefore how many bits are in the set of $N_{UE}$ bits 310 as well as how many bits are in each TB level bitmap ($N_{HARQ}$) and how many TB level bitmaps associated with other UEs occupy space in the codebook. In this particular example, only one UE, $UE_0$, precedes $UE_1$. $UE_2$ is likewise able to determine where it will start to receive the TB level feedback information.

The remainder of the $X-N_{UE}-Y*N_{HARQ}$ bits 330 are dynamically sized CBG level groups of bits 332,334,336, which can be considered as bitmaps, for each of the UEs receiving CBG level HARQ feedback and some zero padding bits, as necessary. The number of CBG level bitmaps is equal to, or less than, the number of UEs identified to be receiving HARQ feedback. The reason that the number of CBG level bitmaps could be less than the total number of identified UEs is that if no '0's, indicating NACKs, were received in any of the TB level groups 322, 324, 326, then there would be no CBG level feedback necessary for a respective UE.

FIG. 3 illustrates a detailed view of the CBG level bitmap 334 associated with $UE_1$. The CBG level bitmap 334 is shown to have a size (m) equal to a number of '0's from the TB level bit map 324, in this case $m_1$=4, (the subscript 1 denoting $UE_1$) multiplied by a number of CBGs ($N_{CBG}$) per transmission block TB. In the example of FIG. 3, $N_{CBG}$ is equal to 4 and so the total number of bits in the CBG level bitmap is $m_1 \times N_{CBG}$=4×4=16 bits for $UE_1$. The first set of four bits 334a provides HARQ feedback for each CBG of a TB associated with the HARQ process indicated to be a NACK in the first bit 324a at the TB level bitmap. Each bit is either an ACK ('1') or a NACK ('0'). Each of the three other sets of four bits 334b, 334c and 334d, likewise provides ACKs and NACKs for each respective CBG of the four CBGs for the TBs associated with HARQ processes associated with the fourth 324b, fifth 324c and seventh 324d bits of the TB level bitmap 324. In the case of $UE_0$, the number of bits in the CBG level bitmap would be 8 as the number ($m_0$) of '0's from the TB level bit map 322 is 2 and $N_{CBG}$ is 4.

$UE_1$ is able to determine where it will start to receive the CBG level feedback information based on the fact that $UE_1$ knows where the first CBG level bitmap begins (size of group of $N_{UE}$ bits+number of UEs selected for feedback multiplied by $N_{HARQ}$) as well as how many UEs precede $UE_1$, i.e. how many CBG level bitmaps there are and the size of each of those CBG level bitmaps for each UE. In the case of $UE_1$, there is only one CBG level bitmap preceding the CBG level bitmap of $UE_1$ and the size of the CBG level bitmap for $UE_0$ can be determined as $N_{CBG}$=4 multiplied by 2 bits being "0"s in the TB level bitmap 322 for $UE_0$, resulting in a total of 8 bits for the $UE_0$ CBG level bitmap.

When the total number of bits of the CBG level block of bitmaps is less than $X-N_{UE}-Y*N_{HARQ}$ bits, any remaining bits 340 can be zero padded to reach the total number of X bits.

Dynamic Indication Signaling Mechanism with Equal Sized CBG Level Bitmaps

FIG. 4 illustrates an example of a semi-static codebook 400 of configurable fixed length used for identifying, for each UE of the group of semi-statically selected UEs, a subset of dynamically selected UEs that are being provided HARQ feedback and then providing the appropriate feedback to that subset of UEs. The codebook 400 has a length of X bits that is semi-statically configured for the group UEs. As in FIG. 3, the first $N_{UE}$ bits 410 correspond to the number of UEs in the semi-statically selected group of UEs and subsequent to the first $N_{UE}$ bits, there is a TB level block 420, the TB level block containing Y groups 422, 424, 426 of $N_{HARQ}$ bits, for a total of $Y*N_{HARQ}$ bits.

A remainder of the bits ($X-N_{UE}-Y*N_{HARQ}$ bits) 430 are used to provide HARQ feedback for particular CBGs, of a total number of CBGs, in a given TB associated with a particular HARQ process, i.e. a HARQ process identified with a '0' at the TB level bits. The CBG level bitmaps are of fixed size for each UE, as opposed to FIG. 3 in which the CBG level bitmaps varied in size based on the number of NACKs in the TB level bitmaps. If the number of CBG level bits providing the HARQ feedback information for a given UE is less than the number of bits allocated for the UE, then zero padding bits (440b for example for CBG level bits 434) are added to fill out the total number of bits in the CBG level bitmap.

Using the UE level block of $N_{UE}$ bits, a UE configured with the corresponding GC-DFI-RNTI value can detect whether or not it is indicated in the current instance of the DFI based on the value of its respective bit corresponding to the index indicated to the UE in the configuration message. As such, for a group of Y UEs, i=0 to Y−1 the $i^{th}$ indicated UE determines that its TB level indication field will start after $N_{UE}+i*N_{HARQ}$ bits and spans a length of $N_{HARQ}$ bits.

For the $i^{th}$ indicated UE, depending on the total number of UEs with at least one TB level NACK from the Y indicated UEs, say V UEs, the $i^{th}$ indicated UE determines that the remaining X bits (after the TB level block) are equally divided into V CBG level HARQ feedback bitmaps. If the number of bits does not equally divide into V portions, the bits are divided into V portions and any remaining bits are zero padded, e.g., at the end of the X bits codebook.

In FIG. 4 the codebook having X bits is identified by reference character 400. The set of the first $N_{UE}$ bits 410 is shown to include a mixture of '1's and '0's having a similar meaning to that described above for FIG. 3.

There are three bits 410a, 410b and 410c in the first $N_{UE}$ bits 410 that are '1's. The UEs that are associated with bits being set to '1' of the first $N_{UE}$ bits 410 are then associated with the identifiers $UE_0$, $UE_1$ and $UE_2$.

Because there are three UEs indicated to be provided HARQ feedback, there are three TB level bitmaps of $N_{HARQ}$ bits identified by reference characters 422, 424 and 426. A detailed view of the bits in TB level bitmaps 422 and 424 are shown to include a mixture of '1's and '0's having a same meaning as described above for FIG. 3 noting again that the base station indicates a TB level NACK for a given HARQ process only after the minimum DFI delay from the end of a detected (re)transmission of the corresponding TB on PUSCH if the base station has failed to decode that TB. The base station indicates a '1' for the given HARQ process otherwise. The number of $N_{HARQ}$ bits in FIG. 4 is 8 bits. However, it is to be understood that this is merely an example and the value of $N_{HARQ}$ bits can be any appropriate value, e.g., 16 bits. For each UE that is indicated to be receiving feedback, there are eight possible HARQ processes that could be provided with an ACK or NACK. In the example of FIG. 4, as it is assumed that the HARQ processes are active and due for feedback, for $UE_0$ all of the first, second, third, fourth, fifth sixth, seventh and eighth bits of TB level bitmap 422 are '1' indicating an ACK of receipt for a transmission associated with those HARQ processes. For $UE_1$ the second, third, sixth, and eighth bits of TB level bitmap 424 are '1' indicating an ACK of receipt for a transmission associated with those HARQ process and the first 424a, fourth 424b, fifth 424c and seventh 424d bits are '0' indicating a NACK.

$UE_1$ is able to determine the bit position at which it will start to receive the TB level feedback information for $UE_1$ in a same manner as described above for FIG. 3. $UE_0$ and $UE_2$ are likewise able to determine the bit position at which they will start to receive the TB level feedback information.

The remainder of the $X-N_{UE}-Y*N_{HARQ}$ bits 430 are a CBG level block of bits containing dynamically sized CBG level groups of bits 434,436, or bitmaps, each bitmap having an equal size, for each of the UEs receiving HARQ feedback. In some embodiments, the remainder of the $X-N_{UE}-Y*N_{HARQ}$ bits 430 are a CBG level block of bits containing semi-statically sized CBG level groups of bits 434,436, or bitmaps, each bitmap having a fixed size, for each of the UEs receiving HARQ feedback. The number of CBG level bitmaps is equal to, or less than, the number of UEs identified to be receiving HARQ feedback. In the example of FIG. 4, for $UE_0$, since all of the TB level bitmap bits were ACKs, there is no CBG level HARQ feedback and so the CBG level feedback begins with CBG level feedback for $UE_1$.

FIG. 4 illustrates an expanded view of the CBG level bitmap 434 of $UE_1$. The CBG level bitmap 434 is shown to have a size equal to 18 bits, which is the same as each of the other CBG level bitmaps. The number of bits being actively used of the 18 bits is equal to a number $m_1$ of '0's from the TB level bit map 424, in this case 4, multiplied by a number ($N_{CBG}$) of code block groups (CBGs) per transmission block (TB). In some embodiments, the value of $N_{CBG}$ is specific to the UE and other UEs do not know the value for that UE. Different UEs may be configured with a different value of $N_{CBG}$. The value of $N_{CBG}$ may be configured by higher layer signaling. In the example of FIG. 4, the number of CBGs per TB is 4 and so the total number of bits being actively used in the CBG level bitmap is $m_1 \times N_{CBG}=4\times4=16$ bits for $UE_1$. The last two bits 440b of the total number of 18 bits of the CBG level bitmap 434 are zero padded. Zero padding bits 440c are also shown to occur in CBG level bitmap 436.

$UE_1$ is able to determine the bit position at which it will start to receive the CBG level feedback information for $UE_1$ based on the fact that $UE_1$ knows where the first CBG level bitmap begins (size of group of $N_{UE}$ bits+number of UEs indicated to be provided feedback multiplied by the number of HARQ process) as well as how many UEs out of the V UEs precede $UE_1$. In the case of $UE_1$, there are no CBG level bitmaps preceding the CBG level bitmap of $UE_1$, as discussed above.

Dynamic Indication Signaling Mechanism with No CBG Level Bitmaps

FIG. 5 illustrates an example of a semi-statically configurable fixed length codebook 500 used for identifying, for each UE of the group of semi-statically selected UEs, a subset of dynamically selected UEs that are being provided HARQ feedback and then providing the appropriate feedback to that subset of UEs. The codebook 500 has a length of X bits. The first $N_{UE}$ bits 510 correspond to the number of UEs in the semi-statically selected group of UEs. The UEs indicated to be provided feedback are addressed with a same CG GC-DFI-RNTI. Subsequent to the first $N_{UE}$ bits, there is a TB level block of bits 520, the TB level block containing Y groups 522, 524, 526 of $N_{HARQ}$ bits, for a total of $Y*N_{HARQ}$ bits, where $N_{HARQ}$ is a number of HARQ processes per UE, the same for all UEs, and Y is the number of UEs from the first $N_{UE}$ bits that are indicated to have HARQ feedback. If a number of bits $N_{UE}+Y*N_{HARQ}$ is less than X, then any remaining bits 540 are zero padded bits to fill out the total number of bits in the codebook to be equal to X.

Using the UE level block of $N_{UE}$ bits 510, a UE configured with the corresponding GC-DFI-RNTI value can detect whether or not it is indicated in the current instance of the DFI based on the value of its respective bit corresponding to the index indicated to the UE in the configuration message. As such, for a group of Y UEs, i=0 to Y−1, the $i^{th}$ indicated UE determines that its TB level indication field will start after $N_{UE}+i*N_{HARQ}$ bits and spans a length of $N_{HARQ}$ bits.

In FIG. 5 the codebook having X bits is identified by reference character 500. The group of the first $N_{UE}$ bits 510 is shown to include a mixture of '1's and '0's having a similar meaning to that described above for FIG. 3. It should be noted though that the UE determines a valid TB level ACK or NACK for a given HARQ process only if such feedback has been received on PDCCH after the minimum DFI delay from the end of a (re)transmission of the corresponding TB on PUSCH. The UE may disregard the TB level feedback bit otherwise.

There are three bits 510a, 510b and 510c in the first $N_{UE}$ bits 510 that are '1's. The UEs that are associated with bits being set to '1' of the first $N_{UE}$ bits 510 are then associated with the identifiers $UE_0$, $UE_1$ and $UE_2$.

As there are three UEs indicated to be provided HARQ feedback, there are three TB level bitmaps of $N_{HARQ}$ bits identified by reference characters 522, 524 and 526. An expanded view of the bits in TB level bitmaps 522 and 524 are shown to include a mixture of '1's and '0's. The legacy connotation of '1' and '0' in AUL-DFI can be used as a respective UE should be able to distinguish a '0' as valid NACK or invalid NACK. The number of $N_{HARQ}$ bits in FIG. 5 is 8 bits. However, it is to be understood that this is merely an example and the value of $N_{HARQ}$ bits can be any appropriate value, e.g., 16 or 32 bits. For each UE that has been identified that it will be receiving feedback, there are eight possible HARQ processes that could be provided with an ACK or NACK. In the example of FIG. 5, for $UE_0$ the first, third, fourth, sixth, seventh and eighth bits of TB level bitmap 522 are '1' indicating an ACK and the second and fifth bits are '0' indicating a NACK. For $UE_1$ the second, third, sixth, and eighth bits of TB level bitmap 524 are '1' indicating an ACK and the first, fourth, fifth and seventh bits are '0' indicating a NACK.

$UE_1$ is able to determine where it will start to receive the TB level feedback information for $UE_1$ in a same manner as described above for FIG. 3. Zero padding bits are added for bits not being used for HARQ feedback, as shown by 540.

Embodiments of the type described with regard to FIG. 5 without the CBG level HARQ feedback information may reduce the LBT overhead at the base station and thus the level of contention in the channel as well as the feedback latency. In addition, the CRC overhead may be significantly reduced as compared to the base station attaching CRC bits to each UE-specific DFI.

UE Grouping Criteria

In some embodiments, a group of UEs is semi-statically selected to receive a group common downlink feedback information (GC-DFI) scrambled with a GC-DFI radio network temporary identifier (RNTI) value. UEs may be selected to be in a particular group based on one or more of the following:

the UEs are configured with the same time-domain resources and with either same or different non-overlapping frequency-domain resources;
  the UEs are configured with, or are capable of, CBG-based transmission or retransmission on configured grant resources;
  the UEs are configured with the same number of CBGs per TB;
  the UEs have similar long-term geometry in the cell, e.g., cell edge or cell centre, UEs operate on cells that are configured with the same timing advance group (TAG), or report similar RRM measurements for cell quality which can either be derived based on Synchronization Signal/PBCH block (SSB) or channel state information reference signal (CSI-RS), or for channel occupancy/coexisting interference such as received strength signal indicator (RSSI);
  the UEs are transmitting traffic with a same channel access priority class (CAPC) index;
  when a set of multiple active resource configurations per bandwidth part (BWP) is pre-defined/pre-configured for the CG UEs, each UE group may correspond to one active resource configuration per cell, wherein the UE maps one active resource configuration to one channel access priority class based on higher-layer signaling/configuration;
  in the case of wideband operation, e.g., the UE is configured to transmit uplink transmissions with CG on a BWP that comprises more than one channel (or LBT subband), the UE maps one active resource configuration to one LBT subband, and possibly one priority class, based on higher-layer signaling/configuration.

Higher-Layer Signaling and Configurations

In some embodiments, a UE within the semi-statically selected group can be provided with information to configure the UE to receive and decode a codebook in a DFI that will enable the UE to determine if it will be provided with HARQ feedback. Configuration information that can be provided to the UE includes:

a group common radio network temporary identifier (RNTI) associated with the group of UEs;
  a size of the semi-statically selected group of UEs; and
  a logical index indicator enabling the UE to determine, based on a location in the group common DCI format, whether the UE is dynamically selected to receive HARQ acknowledgement feedback. The group common RNTI and the index value of the indication bit may be provided by higher layer signaling.

In some embodiments, additional configuration information, which may be sent together with the configuration information described above, or separately from that information, may include a size for the codebook to be used in the DCI format.

In some embodiments, the additional configuration information may include the minimum PUSCH-to-HARQ feedback timing parameter which can be configured to the UE through RRC signalling or activation DCI. This minimum DFI delay parameter, for instance, prevents the CG UE from misinterpreting a '0' in a DFI bitmap received immediately or shortly after the transmission of the corresponding HARQ process for a valid HARQ-NACK before the base station processes/soft-combines the PUSCH. An example is when the PUSCH transmission is over multiple slots in which case the UE follows the same procedure as discussed earlier and determines a valid TB level NACK for the corresponding HARQ process only if it has been received on PDCCH after the minimum DFI delay from the end of PUSCH transmission in a last slot from the multiple slots. As such, avoiding improper CWS adjustment and potential false initiation of an autonomous HARQ retransmissions by the UE. The minimum DFI delay or minimum PUSCH-to-HARQ feedback timing parameter may also be used to allow the base station to set virtual ACKs in the TB level bitmaps of the group common DFI for processes that are active but not yet due for feedback while preventing the UE from misinterpreting them for valid ACKs, allowing as such the UEs to identify and count the HARQ processes with TB level NACK and associated with CBG level feedback in the codebook.

In some embodiments, each UE in the group may also be provided with a configuration for a search space set and a corresponding control resource set (CORESET) for monitoring physical downlink control channel (PDCCH) candidates for the DCI format. In some embodiments, DCI format includes a cyclic redundancy check (CRC) scrambled by the group common RNTI.

Aspects of the present application pertain in particular to operation on a cell with shared spectrum access, i.e. in unlicensed spectrum, using channel access/listen-before-talk (LBT) mechanisms and defining contention window adjustment. Some aspects of the present application may mitigate excess latency and may improve spectrum efficiency.

Impact on UL HARQ and CWS Adjustment Procedures

The following describes examples of what the and '0's received in the TB level bitmaps may represent and how this may affect the contention window size adjustment that occurs when NACKs are received.

Receiving '1' in the TB level field of $UE_i$ corresponding to HARQ process j in a given reference slot/window:

if HARQ process j is active for $UE_i$ and is due for feedback, $UE_i$ counts the received "1" as a valid TB level ACK:

for CWS adjustment for the CAT4 LBT performed on the whole TB BW, $UE_i$ counts the received "1" as success (resetting the CWS to minimum) or towards the calculation of the Z (ACK ratio) value, if applicable;

for CWS adjustment for the CAT4 LBT performed on a subband of within the BW of the TB, $UE_i$ propagates the ACK as CBG level ACKs to all corresponding CBGs, subsets of such CBG level ACKs are counted as success (resetting the CWS to minimum) or towards the calculation of the Z value, per respective containing/overlapping subband. It should be understood therefore that if the transmission is TB based, the $UE_i$ counts the ACK as success (resetting the CWS to minimum) or towards the calculation of the Z value if applicable, per respective containing/overlapping subband;

if process j is active for $UE_i$, but is not due for feedback, i.e. it is too early yet for feedback to be expected, or if process j has not been used by $UE_i$, $UE_i$ ignores the status of that '1' bit as an invalid HARQ ACK.

Receiving '0' in the TB level field of $UE_i$ corresponding to HARQ process j in a given reference slot/window:

the UE may validate accuracy of DFI detection by verifying that HARQ process j is in use and due for feedback, i.e., UE determines the TB level '0' is a valid HARQ NACK;

For CWS adjustment for the CAT4 LBT performed on the whole TB BW, $UE_i$ counts the received "0" as a valid TB level HARQ NACK or towards the calculation of the Z value, if applicable;

For CWS adjustment for the CAT4 LBT performed on a subband of within the BW of the TB, $UE_i$ determines if process j has a subsequent CBG level field, e.g., based on higher layer configuration, and extracts corresponding CBG level feedback bits for all corresponding CBGs. Subsets of such CBG level feedback bits are counted towards the calculation of the Z value per respective containing/overlapping subband. It should be understood that if CBG level HARQ feedback is not provided, the UE counts the received "0" as a valid TB level HARQ NACK or towards the calculation of the Z value, per respective containing/overlapping subband.

In some embodiments, retransmission of CBGs based upon received CBG level NACKs are prepared according to the configured RV sequence and available transmission resources.

Some embodiments of the disclosure provide a DCI format that is used for the transmission of HARQ-ACK feedback commands for uplink transmission with configured grant. The DCI format can be used to transmit:

a. a UE level Block containing: Bit number 1, bit number 2, . . . , bit number $N_{UE}$;

b. a TB level Block containing Y equal-sized bitmaps: $UE_1$ HARQ bitmap, $UE_2$ HARQ bitmap, . . . , and $UE_Y$ HARQ bitmap;

c. a CBG level Block containing Y variable-sized bitmaps ($m*N_{CBG}$, $0 \leq m \leq N_{HARQ}$): $UE_1$ CBG bitmap, $UE_2$ CBG bitmap, . . . , and $UE_Y$ CBG bitmap; and d. Zero padding bits (if necessary).

Some embodiments of the disclosure provide a DCI format that is used for the transmission of HARQ-ACK feedback commands for uplink transmission with configured grant. The DCI format can be used to transmit:

a. a UE level Block containing: Bit number 1, bit number 2, . . . , bit number $N_{UE}$;

b. a TB level Block containing Y equal-sized bitmaps: $UE_1$ HARQ bitmap, $UE_2$ HARQ bitmap, . . . , and $UE_Y$ HARQ bitmap; and c. a CBG level Block containing Y equal-sized bitmaps ($m*N_{CBG}$, $0 \leq m \leq N_{HARQ}$): $UE_1$ CBG bitmap, $UE_2$ CBG bitmap, . . . , and $UE_Y$ CBG bitmap, wherein each of the Y equal-sized bitmaps may have zero padding bits, if necessary).

In some embodiments, the CBG bitmap equal size is dynamically determined based on the size Y or a preconfigured size.

The examples of FIGS. 3 and 4 include codebooks that correspond to the information included in the DCI format above defined by features a, b, c, and d. FIG. 5 includes a codebook that does not include the information in feature c, i.e. the CBG level block.

Figure 6:
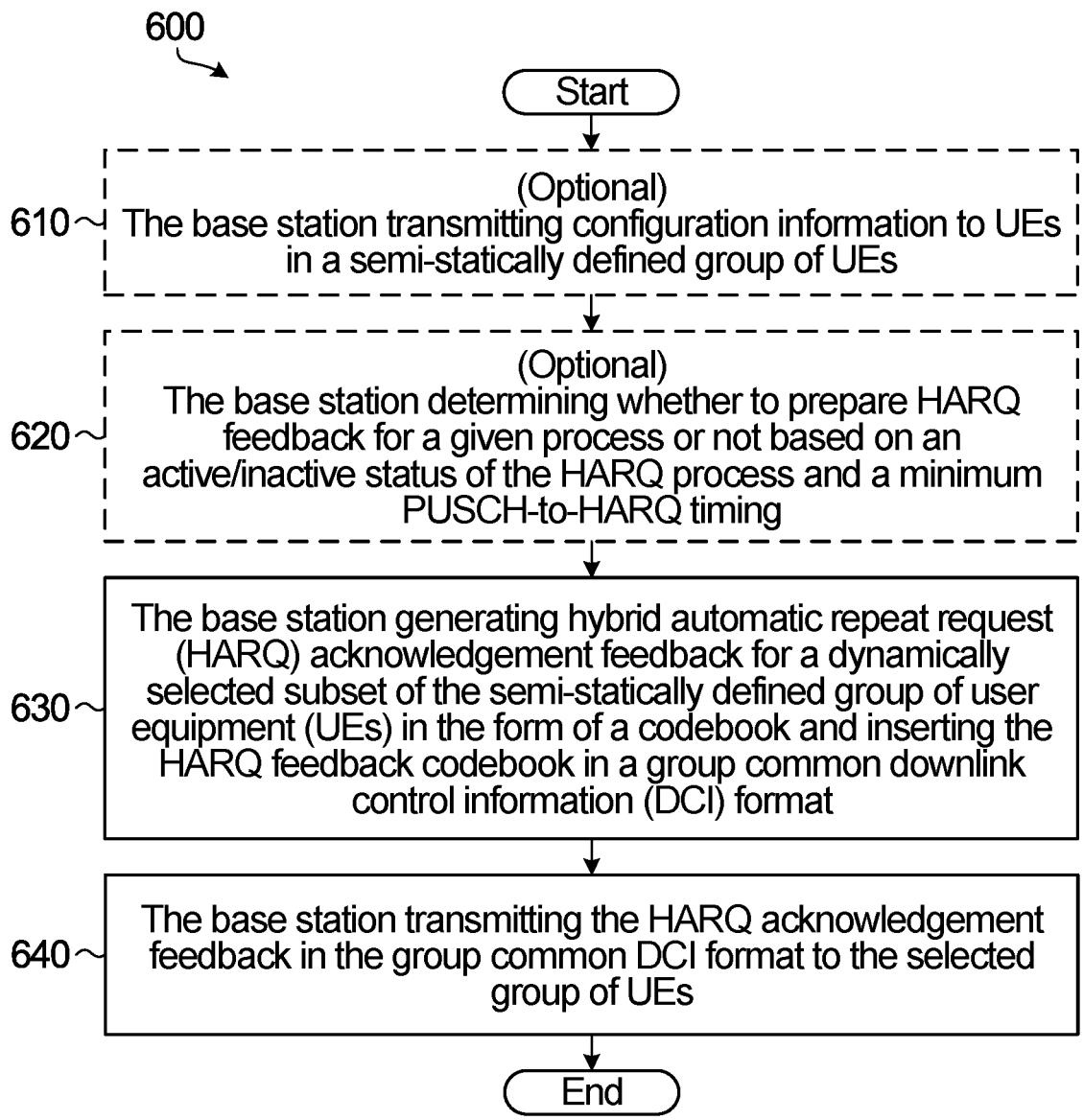
FIG. 6 is a flow diagram of example operations in a base station in accordance with an embodiment of the present disclosure.

FIG. 6 is a flow diagram of example operations 600 performed in a base station in accordance with an embodiment of the present disclosure. In some embodiments, the operations collectively involve a method for wireless communications occurring in an unlicensed spectrum. Step 610 involves an optional step of the base station transmitting configuration information to UEs in a semi-statically defined group of UEs. The configuration information may include one or more of: a group common radio network temporary identifier (RNTI) associated with the group of UEs; a logical index indicator enabling the UE to determine, based on a location in the group common downlink control information (DCI) format whether the UE is dynamically selected to receive HARQ acknowledgement feedback; a size of the group of UEs; a size for the codebook to be used in the DCI format; and configuration of a search space set and a corresponding control resource set (CORESET) for monitoring physical downlink control channel (PDCCH) candidates for the group common DCI format comprising the fixed size codebook.

Step 620 involves an optional step of the base station determining whether to prepare HARQ feedback for a given process or not based on an active/inactive status of the HARQ process and a minimum DFI delay parameter such as minimum PUSCH-to-HARQ timing. As discussed earlier, this step enables the base station to indicate a valid TB level HARQ NACK for a given HARQ process when CBG level feedback is provided in the DFI.

Step 630 involves the base station generating HARQ acknowledgement feedback for a dynamically selected subset of the semi-statically defined group of UEs in the form of a codebook and inserting the HARQ feedback codebook in a group common DCI format. In some embodiments, dynamically selecting the subset of UEs from the group of UEs is based upon one or more of: the semi-statically configured size of the codebook in the DCI format; a size of a TB level indication bitmap per UE; a number of TBs for each CBG level feedback that is indicated is provided for each dynamically selected UE; a size of a CBG level indication bitmap per TB; and a semi-statically configured size of a CBG-level indication bitmap per dynamically selected UE.

In some embodiments, selection of the semi-statically defined group of UEs from which the subset is then dynamically selected is based upon at least one of: selecting UEs that have been configured with the same time-domain resources and with non-overlapping frequency-domain resources; selecting UEs that have been configured with, or are capable of, CBG-based transmission or retransmission on configured grant resources; selecting UEs that have been configured with the same number of CBGs per TB; selecting UEs that have similar long-term geometry in the cell, e.g., cell edge or cell centre, or report similar RRM measurements for cell quality which can either be derived based on SSB or CSI-RS, or for channel occupancy/coexisting interference such as RSSI; selecting UEs that have been configured to transmit traffic with a same channel access priority class index; selecting UEs having a same active resource configuration when a set of multiple active resource configurations per bandwidth part (BWP) is pre-defined for the UEs, and each UE group may correspond to one active resource configuration per cell, wherein the UE maps one active resource configuration to one channel access priority class based on higher-layer signaling/configuration; and selecting, in the case of wideband operation, UEs for which the UE maps one active resource configuration to one LBT subband, and possibly one priority class, based on higher-layer signaling/configuration.

Step 640 involves the base station transmitting the HARQ acknowledgement feedback in the group common DCI format to the dynamically selected subset of the semi-statically defined group of UEs. The DCI format includes a codebook of a semi-statically configured fixed size.

The example operations 600 are illustrative of an example embodiment. Various ways to perform the illustrated operations, as well as examples of other operations that may be performed, are described herein. Further variations may be or become apparent.

Figure 7:
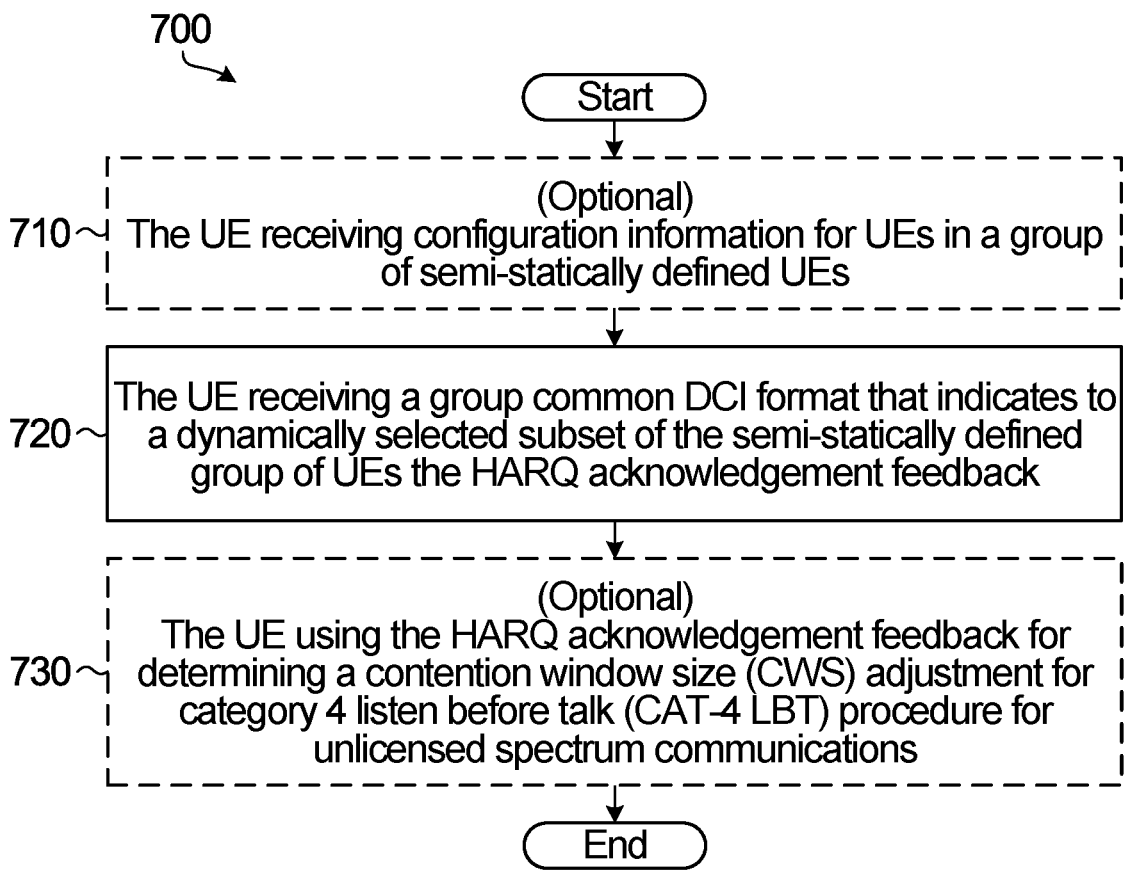
FIG. 7 is a flow diagram of example operations in a UE in accordance with an embodiment of the present disclosure.

FIG. 7 is a flow diagram of example operations 700 performed in a UE in accordance with an embodiment of the present disclosure. In some embodiments, the operations collectively involve a method for wireless communications occurring in an unlicensed spectrum. In some embodiments, the operations collectively involve a method for wireless communications occurring in a cell with shared access spectrum. Step 710 involves an optional step of the UE receiving configuration information for UEs in a group of semi-statically defined UEs. The configuration information may be higher layer configuration information. The configuration information may include one or more of: a group common radio network temporary identifier (RNTI) associated with the group of UEs; a size of the group of UEs; a logical index indicator for the UE to determine a bit position in the group common DCI format, the bit indicates whether the UE is dynamically selected to receive HARQ acknowledgement feedback; a size for the codebook to be used in the DCI format; and configuration of a search space set and a corresponding control resource set (CORESET) for monitoring physical downlink control channel (PDCCH) candidates for the group common DCI format comprising the configurable fixed length codebook.

Step 720 involves the UE receiving a group common DCI format that indicates to a dynamically selected subset of the semi-statically defined group of UEs the HARQ acknowledgement feedback. The UE of the semi-statically selected group of UEs may or not be one of the dynamically selected UEs, but the UE is capable of decoding the DCI format and determining if the UE has been selected to receive the HARQ acknowledgment feedback in the particular occurrence of DCI format. The DCI format includes a codebook of a semi-statically configured fixed size.

In some embodiments, the UE determines whether there is HARQ feedback in the DCI format for the UE. If there is no feedback, the UE disregards the information in the DCI format.

If there is HARQ feedback information for the UE, the UE determines the feedback information from the received group common DCI format. This may involve the UE locating its corresponding fields within the codebook of the group common DCI format. The UE then determines the feedback status, e.g., valid TB ACK or virtual TB ACK, for each process based the active/inactive status of the process and the configurable minimum PUSCH-to-HARQ timing parameter. However, if the minimum PUSCH-to-HARQ timing parameter is set to zero or not configured, the UE assumes that an HARQ process is due for feedback immediately after the corresponding PUSCH is transmitted. This assumption is important for the UE to decide whether to disregard the corresponding bit in the TB level bitmap or treat it as a valid feedback.

In optional step 730, the UE uses the HARQ acknowledgement feedback for determining a contention window size (CWS) adjustment for category 4 listen before talk (CAT-4 LBT) procedure for unlicensed spectrum communications or for operation in a cell with shared spectrum access.

The example operations 700 are illustrative of an example embodiment. Various ways to perform the illustrated operations, as well as examples of other operations that may be performed, are described herein. Further variations may be or become apparent.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding EDs and base stations are known to those of skill in the art. As such, these details are omitted here for clarity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other figures are also intended solely for illustrative purposes.

Other implementation details could also vary between different embodiments. For example, some of the examples above refer to NR-U and LTE terminology. However, the embodiments disclosed herein are not in any way limited to NR-U or LTE systems.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method comprising:
transmitting hybrid automatic repeat request (HARQ) acknowledgement feedback in a group common downlink control information (DCI) format to a dynamically selected subset of a semi-statically defined group of user equipment (UEs), the DCI format comprising a codebook of a semi-statically configured size;
wherein transmitting the HARQ acknowledgement feedback in the group common DCI format comprises transmitting:
a first block of N bits, where N is equal to the number of UEs in the semi-statically defined group of UEs, each bit used to indicate if a UE associated with the bit is dynamically selected to receive HARQ acknowledgement feedback; and
a second block of M groups of bits, where M is equal to the number of UEs dynamically selected to receive HARQ acknowledgement feedback, each group of bits defining a bitmap of HARQ feedback associated with a respective UE identified in the first block of N bits indicated to receive HARQ acknowledgement feedback, each bit in a respective group corresponding to HARQ acknowledgement feedback for a particular HARQ process,
wherein zero-padding bits are added to the HARQ acknowledgement feedback when the HARQ acknowledgement feedback is allocated to include X bits and a number of bits N+M*number of HARQ processes configured per UE is less than the allocated X bits.

2. The method of claim 1, wherein the HARQ acknowledgment feedback is a downlink feedback information (DFI) in relation to at least one configured grant transmission by at least one UE in the subset of UEs.

3. The method of claim 1, wherein the HARQ acknowledgement feedback in the second block of M groups of bits comprises transmission block (TB) level feedback.

4. The method of claim 1 comprising:
transmitting higher layer configuration information to UEs in the group of UEs that comprises one or more of:
a group common radio network temporary identifier (RNTI) associated with the group of UEs;
a logical index indicator for the UE to determine a bit position in the group common DCI format, the bit indicates whether the UE is dynamically selected to receive HARQ acknowledgement feedback; and
a size for the codebook to be used in the DCI format.

5. The method of claim 1 comprising:
transmitting higher layer configuration information to UEs in the group of UEs that comprises:
configuration of a search space set and a corresponding control resource set (CORESET) for monitoring physical downlink control channel (PDCCH) candidates for the group common DCI format comprising the codebook of the semi-statically configured size.

6. The method of claim 1, wherein transmitting HARQ acknowledgement feedback using the group common DCI format comprises transmitting the DCI format having a cyclic redundancy check (CRC) that is scrambled by a radio network temporary identifier (RNTI) associated with the semi-statically defined group of UEs.

7. The method of claim 1, wherein a size of the M groups of bits is the same for each of the M groups based on a number of HARQ processes.

8. The method of claim 7, wherein the size of each of the M groups of bits is determined by a number of HARQ processes configured by a higher layer per UE for uplink transmission in an active bandwidth part (BWP).

9. The method of claim 1, wherein transmitting the DCI format further comprises transmitting:
a third block of P groups of bits, each group of bits defining a bitmap of HARQ acknowledgement feedback for each code block group (CBG) of a plurality of CBGs in a transmission block (TB) transmitted by a UE and corresponding to a particular HARQ process, each group of bits associated with a TB for a UE identified in the first block of N bits indicated to receive HARQ acknowledgement feedback.

10. The method of claim 9, wherein the size of the third block of P groups of bits is determined by a number of CBGs per TB configured to the UE by a higher layer.

11. The method of claim 9, wherein a size of the third block of P groups of bits is determined dynamically based in part on a number of UEs indicated to receive HARQ acknowledgement feedback in the first block of N bits and a number of valid negative acknowledgements (NACKs) indicated for each UE associated with one of the M groups of bits in the second block.

12. The method of claim 11, wherein the base station indicates:
a valid NACK for a given HARQ process for a UE associated with one of the M groups of bits in the second block only after a minimum downlink feedback information (DFI) delay from the end of a detected (re)transmission of the corresponding TB on PUSCH if the base station has failed to decode that TB; or an ACK for the given HARQ process.

13. The method of claim 11, wherein each of the P groups of bits are equal in size and zero-padding bits, if appropriate, are inserted in locations in each group of bits not used for HARQ acknowledgement feedback.

14. The method of claim 11, wherein a size of each of the P groups of bits is based on the number of valid NACKs indicated for each UE associated with one of the M groups of bits in the second block and a number of CBGs per TB and zero-padding bits, if appropriate, are inserted subsequent to the third block of P groups of bits.

15. An apparatus comprising:
a processor; and
a non-transitory computer-readable medium having stored thereon computer-implemented instructions, that when executed by the processor cause the apparatus to transmit hybrid automatic repeat request (HARQ) acknowledgement feedback in a group common downlink control information (DCI) format to a dynamically selected subset of a semi-statically defined group of user equipment (UEs), the DCI format comprising a codebook of a semi-statically configured size;
wherein transmitting the HARQ acknowledgement feedback in the group common DCI format comprises transmitting:
a first block of N bits, where N is equal to the number of UEs in the semi-statically defined group of UEs, each bit used to indicate if a UE associated with the bit is dynamically selected to receive HARQ acknowledgement feedback; and
a second block of M groups of bits, where M is equal to the number of UEs dynamically selected to receive HARQ acknowledgement feedback, each group of bits defining a bitmap of HARQ feedback associated with a respective UE identified in the first block of N bits indicated to receive HARQ acknowledgement feedback, each bit in a respective group corresponding to HARQ acknowledgement feedback for a particular HARQ process,
wherein zero-padding bits are added to the HARQ acknowledgement feedback when the HARQ acknowledgement feedback is allocated to include X bits and a number of bits N+M*number of HARQ processes configured per UE is less than the allocated X bits.

16. A method for a user equipment (UE) that is part of a semi-statically defined group of UEs receiving hybrid automatic repeat request (HARQ) acknowledgement feedback, the method comprising:
the UE receiving the HARQ acknowledgement feedback in a group common downlink control information (DCI) format, the DCI format comprising a codebook of a semi-statically configured size;
wherein receiving the HARQ acknowledgement feedback in the group common DCI format comprises receiving:
a first block of N bits, where N is equal to the number of UEs in the semi-statically defined group of UEs, each bit used to indicate if a UE associated with the bit is dynamically selected to receive HARQ feedback; and
a second block of M groups of bits, where M is equal to the number of UEs dynamically selected to receive HARQ acknowledgement feedback, each group of bits defining a bitmap of HARQ feedback associated with a UE identified in the first block of N bits and indicated to receive HARQ acknowledgement feedback, each bit in a respective group corresponding to HARQ acknowledgement feedback for a particular HARQ process,
wherein zero-padding bits are added to the HARQ acknowledgement feedback when the HARQ acknowledgement feedback is allocated to include X bits and a number of bits N+M*number of HARQ processes configured per UE is less than the allocated X bits.

17. The method of claim 16, wherein the HARQ acknowledgment feedback is a downlink feedback information (DFI) in relation to configured grant transmission by at least one UE in the subset of UEs.

18. The method of claim 16, wherein the HARQ acknowledgement feedback in the second block of M groups of bits comprises transmission block (TB) level feedback.

19. The method of claim 16 comprising:
receiving higher layer configuration information that comprises one or more of:
a group common radio network temporary identifier (RNTI) associated with the group of UEs of which the UE is part thereof;
a logical index indicator for the UE to determine a bit position in the group common DCI format, the bit indicates whether the UE is dynamically selected to receive HARQ acknowledgement feedback; and
a size for the codebook to be used in the DCI format.

20. The method of claim 16 comprising:
receiving configuration information that comprises:
configuration of a search space set and a corresponding control resource set (CORESET) for monitoring physical downlink control channel (PDCCH) candidates for the group common DCI format comprising the codebook of the semi-statically configured size.

21. The method of claim 16, wherein receiving HARQ acknowledgement feedback using the group common DCI format comprises receiving the DCI format having a cyclic redundancy check (CRC) that is scrambled by a radio network temporary identifier (RNTI) associated with the semi-statically defined group of UEs.

22. The method of claim 21 comprising descrambling the received DCI format using the RNTI associated with the group of UEs.

23. The method of claim 16, wherein a size of the M groups of bits is the same for each of the M groups based on a number of HARQ processes.

24. The method of claim 16, wherein receiving the DCI format further comprises receiving:
a third block of P groups of bits, each group of bits defining a bitmap of HARQ feedback for each code block group (CBG) of a plurality of CBGs in a corresponding transmission block (TB) transmitted by the associated UE and corresponding to the particular HARQ process, each group of bits associated with a TB for a UE identified in the first block of N bits indicated to receive HARQ acknowledgement feedback.

25. The method of claim 24, wherein a size of the third block of P groups of bits is based in part on a number of UEs indicated to receive HARQ feedback in the first block of N bits and a number of valid negative acknowledgements (NACKs) indicated for each UE associated with one of the M groups of bits in the second block.

26. The method of claim 24, wherein each of the P groups of bits are equal in size and zero-padding bits, if appropriate, are included in locations in each group of bits not used for HARQ feedback.

27. The method of claim 24, wherein a size of each of the P groups of bits is based on the number of valid NACKs indicated for each UE associated with one of the M groups of bits in the second block and a number of CBGs per TB and zero-padding bits, if appropriate, are inserted subsequent to the third block of P groups of bits.

28. The method of claim 16, wherein the UE uses the HARQ acknowledgement feedback for determining a contention window size (CWS) adjustment for category 4 listen before talk (CAT-4 LBT) channel access procedure for operation in a cell with shared spectrum access.

29. The method of claim 16, wherein the UE determines that a HARQ feedback for each HARQ process is valid when the feedback has been received on a physical downlink control channel (PDCCH) after a configurable minimum downlink feedback information (DFI) delay from the end of a (re)transmission of a corresponding transmission block (TB) on a physical uplink shared channel (PUSCH) and the UE disregards the HARQ feedback otherwise.

30. An apparatus comprising:
a processor; and
a non-transitory computer-readable medium having stored thereon computer-implemented instructions, that when executed by the processor cause the apparatus to receive a HARQ acknowledgement feedback in a group common downlink control information (DCI) format, the DCI format comprising a codebook of a semi-statically configured size;

wherein receiving the HARQ acknowledgement feedback in the group common DCI format comprises receiving:

a first block of N bits, where N is equal to the number of UEs in the semi-statically defined group of UEs, each bit used to indicate if a UE associated with the bit is dynamically selected to receive HARQ feedback; and a second block of M groups of bits, where M is equal to the number of UEs dynamically selected to receive HARQ acknowledgement feedback, each group of bits defining a bitmap of HARQ feedback associated with a UE identified in the first block of N bits and indicated to receive HARQ acknowledgement feedback, each bit in a respective group corresponding to HARQ acknowledgement feedback for a particular HARQ process, wherein zero-padding bits are added to the HARQ acknowledgement feedback when the HARQ acknowledgement feedback is allocated to include X bits and a number of bits N+M*number of HARQ processes configured per UE is less than the allocated X bits.

* * * * *